(12) United States Patent
Elkatatny et al.

(10) Patent No.: US 11,807,805 B2
(45) Date of Patent: Nov. 7, 2023

(54) CALCINED SAUDI CALCIUM BENTONITE AS CEMENT REPLACEMENT IN LOW-DENSITY OIL-WELL CEMENT SYSTEM

(71) Applicant: KING FAHD UNIVERSITY OF PETROLEUM AND MINERALS, Dhahran (SA)

(72) Inventors: Salaheldin Elkatatny, Dhahran (SA); Stephen Adjei, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 17/873,863

(22) Filed: Jul. 26, 2022

(65) Prior Publication Data
US 2023/0287256 A1    Sep. 14, 2023

Related U.S. Application Data

(60) Provisional application No. 63/318,164, filed on Mar. 9, 2022.

(51) Int. Cl.
  *C09K 8/473*    (2006.01)
(52) U.S. Cl.
  CPC .................................... *C09K 8/473* (2013.01)
(58) Field of Classification Search
  CPC . C09K 8/42; C09K 8/46; C09K 8/467; C09K 8/473; E21B 33/13
  See application file for complete search history.

(56) References Cited

U.S. PATENT DOCUMENTS

| | | | | |
|---|---|---|---|---|
| 2,909,223 A | * | 10/1959 | Kaveler | C09K 8/487 166/293 |
| 2,945,769 A | * | 7/1960 | Gama | C04B 28/04 106/718 |
| 4,530,765 A | * | 7/1985 | Sabherwal | C02F 1/283 210/683 |
| 5,183,505 A | | 2/1993 | Spinney | |
| 8,596,356 B2 | | 12/2013 | Brandl et al. | |

(Continued)

FOREIGN PATENT DOCUMENTS

| | | |
|---|---|---|
| CN | 108424091 A | 8/2018 |
| IN | 357262 | 8/2019 |

OTHER PUBLICATIONS

Abbas Al-Hammood et al., Iraqi bentonite as a natural pozzolan for sustainable concrete, May 2021, Research Square, University of Technology (Year: 2021).*

(Continued)

*Primary Examiner* — Angela M DiTrani Leff
(74) *Attorney, Agent, or Firm* — Oblon, McClelland, Maier & Neustadt, L.L.P.

(57) ABSTRACT

A method to incorporate calcined Saudi calcium bentonite as a low-density cement admixture in oil and gas well applications. Low-density cement systems were designed using the calcined Saudi calcium bentonite in an amount of from 10 to 30 weight % of the admixture to form a low-density cement slurry at a density of from 10 pounds per gallon (ppg) to 15 ppg; and injecting the low-density cement slurry into the well to seal the well from the geological formation; and curing the low-density cement slurry in the well to seal the well from the geological formation.

20 Claims, 12 Drawing Sheets

(56) References Cited

U.S. PATENT DOCUMENTS 9,796,622 B2 10/2017 Al-Yami et al.
2008/0066655 A1* 3/2008 Fraser .................. C09K 8/46
106/718

OTHER PUBLICATIONS

Adjei et al., Evaluation of calcined Saudi calcium bentonite as cement replacement in low-density oil-well cement system, 2021, Journal of Petroleum Science and Engineering, 205 (Year: 2021).*

Penson, Calcined Calcium Bentonite Clay as a Partial Replacement of Portland Cement in Mortar, Mar. 2019, The University of British Columbia, retrieved Mar. 20, 2023 from https://open.library.ubc.ca/media/stream/pdf/24/1.0376847/2 (Year: 2019).*

Arinkoola et al., Assessment of Nigerian Calcium Bentonite as Cement Replacement for Shallow depth Oil Well Cementing Operation, Sep. 2022, Nigerian Journal of Technological Development, vol. 19, No. 3, retrieved Mar. 20, 2023 from https://www.ajol.info/index.php/njtd/article/view/232348 (Year: 2022).*

Jaskulski et al., Calcined Clay as Supplementary Cementitious Material, Oct. 2020, materials, MDPI, retrieved Mar. 20, 2023 from https://www.mdpi.com/1996-1944/13/21/4734 (Year: 2020).*

Kumar et al., Effect on Strength Properties of Concrete by Partial Replacement of Cement with Calcium Bentonite and Fly Ash, Apr. 2017, International Journal of Civil Engineering and Technology, vol. 8, Issue 4, pp. 450-455 (Year: 2017).*

Reddy et al., Experimental Investigation of Strength Parameters of Cement and Concrete by Partial Replacement of Cement with Indian Calcium Bentonite, Jan. 2017, International Journal of Civil Engineering and Technology, vol. 8, Issue 1, pp. 512-518 (Year: 2017).*

Mesboua et al., Calcinated Bentonite as Supplementary Cementitious Materials in Cement-Based Mortar, May 31, 2021, Journal of Applied Engineering Sciences, vol. 11(24), Issue Jan. 2021, pp. 23-32 (Year: 2021).*

Kumar Reddy et al., Optimization of Calcined Bentonite Utilization in Cement Concrete Using Response Surface Methodology, Mar. 2021, International Journal of Engineering Trends and Technology, vol. 69, Issue 3, 172-179 (Year: 2021).*

Rakhimova et al., Advances in development of calcined clays as supplementary cementitious materials, 2020, IOP Conf. Ser. Mater. Sci. Eng. 890, 012085 (Year: 2020).*

Laidani et al., Potential pozzolanicity of Algerian calcined bentonite used as cement replacement: optimisation of calcination temperature and effect on strength of self-compacting mortars, Jan. 2020, European Journal of Environmental and Civil Engineering, vol. 26, Issue 4, pp. 1379-1401 (Year: 2020).*

El-Abidine Laidani et al., Experimental investigation on effects of calcined bentonite on fresh, strength and durability properties of sustainable self-compacting concrete, 2019, Construction and Building Materials, 230 (Year: 2019).*

Silica fume, Wikipedia, retrieved Mar. 21, 2023 from https://en.wikipedia.org/wiki/Silica_fume (Year: 2023).*

Doral, Silica Fume, Material Safety Data Sheet, 2016 (Year: 2016).*

Darweesh, et al. ; Hydration of calcined bentonite Portland blended cement pastes ; Indian Journal of Chemical Technology, vol. 14 ; pp. 301-307 ; May 2007 ; 7 Pages.

Naeini, et al. ; A novel stabilized rammed earth using pulp mill fly ash as alternative low carbon cementing material ; Construction and Building Materials, vol. 300 ; Sep. 20, 2021 ; Abstract Only ; 2 Pages.

* cited by examiner

FA_20

CALCINED SAUDI CALCIUM BENTONITE AS CEMENT REPLACEMENT IN LOW-DENSITY OIL-WELL CEMENT SYSTEM

CROSS-REFERENCE TO RELATED APPLICATION

The present application claims benefit of priority to U.S. Provisional Application No. 63/318,164, having a filing date of Mar. 9, 2022, which is incorporated herein by reference in its entirety.

BACKGROUND OF THE INVENTION

Field of the Invention

The present disclosure relates to cement admixtures for use in oil and gas well applications and to the use of calcined Saudi calcium bentonite as a low-density cement admixture in oil and gas well applications.

DESCRIPTION OF THE RELATED ART

An oil-well cement is used in the drilling of oil wells that are subject to high temperatures and pressures. Oil-well cement is typically made of a Portland or pozzolanic cement with special organic retarders to prevent the cement from setting too quickly. In the past, oil-well cement systems used in isolating intervals and supporting casing in petroleum wells were typically designed at densities between 15.6 to 16.4 pounds per gallon (ppg). Such systems are inapplicable in formations with low fracture gradients as they impose high pressure or high equivalent circulating density (ECD) on the bare formation, leading to formation breakdown, loss of a cement slurry, and the loss of the well's integrity.

Standard oil-well cement systems having densities in the range of 14.8-15.6 ppg are not suitable for zonal isolation in shallow intervals. This is because such intervals have weak formations characterized by low strength, which is easily overcome by the higher hydrostatic pressure column exerted on the formations by normal to high-density cement systems. However, the inclusion of materials with a density lower than that of cement in slurry formulations results in density reduction. Such materials include microspheres as disclosed by Nabi Shar et al. in Designing of Ultralight Slurry for Liner Cementation: A Case Study. Pap. Present. Trinidad Tobago Energy Resour. Conf. Port Spain, Trinidad. 27-30 June. SPE-132694; Sarmah et al. in High Compressive Strength, Ultra-lightweight and Lightweight Cement—Formulated with Raw Material Locally Available in Saudi Arabia. Pap. Present. SPE Kingdom Saudi Arab. Annu. Tech. Symp. Exhib. Dammam. 25-28 April. SPE-182736-MS; and Taylor and Iremonger in Design and Application of a New High Performance Lightweight Thermal Cement. Pap. Present. SPE Therm. Well Integr. Des. Symp. Banff, Alberta, Canada. 27-29 November. SPE-193350-MS 27-29 fly ash as disclosed by Golapudi et al. in Improvement of Properties and Microstructure of Oil-well Cements. Soc. Pet. Eng. SPE-26312-MS. 1-44; Jangid and Marjason in Highly Reactive Fly Ash Material Improves Economics of Lightweight Cementing with Lower Carbon Footprint. Pap. Present. SPE Can. Unconv. Resour. Conf.—Canada. 5-7 November. SPE 167203; and Posey and Purvis, in Application of a Lightweight Cement Slurry for the Naturally Fractured Mesa Verde Formations. Pap. Present. SPE Annu. Tech. Conf. Exhib. USA. 26-29 Spetember. SPE-90489, silica fume as disclosed by Golapudi et al. in Improvement of Properties and Microstructure of Oil-well Cements. Soc. Pet. Eng. SPE-26312-MS. 1-44 and Mueller and Dillenbeck in The Versatility of Silica Fume as an Oilwell Cement Admixture. Pap. Present. Prod. Oper. Symp. Oklahoma City. 7-9 April. SPE-21688, metakaolin as disclosed by Bu et al., in Properties of Oil Well Cement with High Dosage of Metakaolin. Constr. Build. Mater. 112, 39-48; and Marshdi, in Benefits of using Mineral Additives as Components of the Modern Oil-well Cement. Case Stud. Constr. Mater. 8, 455-458, ground granulated blast furnace slag (GGBFS) as disclosed by Daulton et al. in Field Experience with Application of Blast Furnace Slag to the Drilling and Cementing Program in the Stratton Field, South Texas Pap. Present. SPE Prod. Oper. Symp. Oklahoma. 2-4 April. SPE-29472. and Mueller et al. in Portland Cement—Blast Furnace Slag Blends in Oilwell Cementing Applications. Pap. Present. SPE Annu. Tech. Conf. Exhib. 22-25 October. SPE-0513, expanded perlite as disclosed by Al-Yami in An Overview of Different Chemicals used in Designing Cement Slurries for Oil and Gas Wells. Pap. Present. Kuwait Oil Gas Show Conf. Kuwait. 11-14 October. SPE-175259-MS and Philippacopoulos and Berndt in Mechanical Response and Characterization of Well Cements. Pap. Present. SPE Annu. Tech. Conf. Exhib. 29 September October. SPE-77755-MS, zeolite as disclosed by Fyten et al. in Development and use of a Cost-Effective, Low-Density Cementing System for Reducing Equivalent Circulating Censities (ECDs) and Obtaining Improved Pipe/Cement/Formation Bonding. Pap. Present. SPE Annu. Tech. Conf. Exhib. Dallas, Texas 9-12 October. SPE-96107; Marshdi in Benefits of using Mineral Additives as Components of the Modern Oil-well Cement. Case Stud. Constr. Mater. 8, 455-458; and Sedić et al. in Optimization of the Cement Slurry Compositions With Addition of Zeolite for Cementing Carbon Dioxide Injection Wells, in: International Conference on Offshore Mechanics and Arctic Engineering, Vol. 56581, American Society of Mechanical Engineers. ASME International and vermiculite as disclosed by da Silva Araujo Filho et al. in Lightweight Oil Well Cement Slurry Modified with Vermiculite and Colloidal Silicon. Constr. Build. Mater. 166, 908-915; the entire foregoing disclosures are incorporated herein by reference.

Fly ash is a cheap pozzolanic admixture and the most used lightweight material. Besides its lower specific gravity, it also possesses pozzolanic ability which allows it to react with portlandite released through the hydration of cement to generate more calcium silicate hydrate (C—S—H), the gel responsible for cement strength. Additionally, the use of fly ash reduces the dependence on Portland cement whose production causes adverse effects on the climate and human health. However, coal-powered plants, the source of fly ash, are expected to phase-out by 2040 due to global warming concerns and hence various studies have been conducted to investigate other pozzolanic materials as an alternative to fly ash.

Different investigations have shown that thermally treated calcium bentonite offers several advantages as a pozzolanic component in cement-based materials. At concentrations varying from 5% to 30% cement replacement, improved resistance to chemical attack and enhanced long-term strength has been demonstrated.

Calcined calcium bentonite has not been investigated in oil-well cementing. Calcium bentonite is a prevalent material. Saudi Arabia has huge deposits of calcium bentonite. One object of the present disclosure is to provide a cement composition and method that is suitable for wellbore applications and overcomes the drawbacks and disadvantages noted above.

SUMMARY OF THE INVENTION

Aspects of this invention provide a method for zonal isolation in a well located in a geological formation, including calcining a uncalcined calcium bentonite having $SiO_2$ in an amount of from 55 weight % (wt. %) to 60 wt. % of the uncalcined calcium bentonite, having $Al_2O_3$ in an amount of from 15 wt. % to 20 wt. % of the uncalcined calcium bentonite, and having $Fe_2O_3$ in an amount of from 10 wt. % to 15 wt. % of the uncalcined calcium bentonite to form a calcined calcium bentonite. Further, the calcined calcium bentonite has $SiO_2$ in an amount of from 55 wt. % to 60 wt. % of the calcined calcium bentonite, $Al_2O_3$ in an amount of from 19 wt. % to 24 wt. % of the calcined calcium bentonite, and $Fe_2O_3$ in an amount of from 15 wt. % to 19 wt. % of the calcined calcium bentonite. The method further includes mixing the calcined calcium bentonite with cement and water to form an admixture. The mixing the calcined calcium bentonite occurs in an amount of from 10 wt. % to 30 wt. % of the admixture to form a low-density cement slurry at a density of from 10 pounds per gallon (ppg) to 15 ppg. The method further includes injecting the low-density cement slurry into the well to seal the well from the geological formation to seal a wall of the well. The method includes curing the low-density cement slurry to seal the wall of the well.

In some embodiments, the uncalcined calcium bentonite is crushed and grinded from uncalcined calcium bentonite chips and then calcined at a temperature of at least 830° C. for at least 3 hours.

In some embodiments, mixing the calcined calcium bentonite with cement comprises mixing the cement, the calcined calcium bentonite, calcium chloride, an anti-settling agent, a defoamer, and water. Further, the slurry comprises the cement in an amount of from 70 wt. % to 90 wt. % of the slurry, an amount of the calcined calcium bentonite of from 10 wt. % to 30 wt. % of the slurry, an amount of the calcium chloride of at least 2.5 wt. % of the slurry, an amount of the anti-settling agent of at least 2 wt. % of the slurry, at least 1 g of the defoamer, and of from 617 g to 643 g of water.

In some embodiments, a ratio of $Na_2O/CaO$ in the calcined calcium bentonite is at least 1.1.

In some embodiments, the calcined calcium bentonite further has an amount of CaO not greater than 2 wt. % of the calcined calcium bentonite, an amount of $K_2O$ not greater than 2 wt. % of the calcined calcium bentonite, an amount of $Na_2O$ not greater than 2 wt. % of the calcined calcium bentonite, an amount of MgO not greater than 2 wt. % of the calcined calcium bentonite, and an amount of $TiO_2$ not greater than 2 wt. % of the calcined calcium bentonite.

In some embodiments, the calcined calcium bentonite has a density of from 2.5 $g/cm^3$ to 4 $g/cm^3$.

In some embodiments, the calcined calcium bentonite has a density of from 2.4 $g/cm^3$ to 3.5 $g/cm^3$.

In some embodiments, the calcined calcium bentonite has crystalline phases. The crystalline phases have an amount of quartz of at least 65 wt. % of the calcined calcium bentonite, an amount of illite of at least 15 wt. % of the calcined calcium bentonite, and an amount of kaolinite of at least 12 wt. % of the calcined calcium bentonite.

In some embodiments, particles of the calcined calcium bentonite have a shape of an irregularly shaped flaky sheet.

In some embodiments, the low-density cement slurry after the curing has a tensile strength of at least 70 pounds per square inch (psi).

In some embodiments, the low-density cement slurry after the curing has a porosity of at least 0.55 porosity units.

In some embodiments, the method further includes adding an amount of silica fume of from 5 wt. % to 10 wt. % of the admixture to the low-density cement slurry to form a well cement system. The method includes injecting the well cement system into the well to seal the well from the geological formation. The method further includes curing the low-density cement slurry to seal the well from the geological formation.

In some embodiments, adding an amount of silica fume of 5 wt. % silica fume to a 20 wt. % admixture increases an ultrasonic cement analyzer (UCA strength) of the admixture by at least 50 psi when compared to a 20 wt. % admixture without silica fume.

In some embodiments, the admixture with the 5 wt. % silica fume has a UCA strength of from 400 psi to 600 psi.

In some embodiments, adding an amount of silica fume of 10 wt. % silica fume to a 20 wt. % admixture increases an ultrasonic cement analyzer (UCA strength) of the admixture by at least 190 psi when compared to a 20 wt. % admixture without silica fume.

In some embodiments, the admixture with the 10 wt. % silica fume has a UCA strength of at least 550 psi.

In some embodiments, particles of the silica fume have a spherical shape.

In some embodiments, the silica fume has an amount of $SiO_2$ of from 90 wt. % to 95 wt. % of the silica fume, an amount of $Al_2O_3$ of from 0.5 wt. % to 1 wt. % of the silica fume, and an amount of $Fe_2O_3$ of from 3 wt. % to 5 wt. % of the silica fume.

In some embodiments, the silica fume has a density of from 2.4 $g/cm^3$ to 3.5 $g/cm^3$.

In some embodiments, the silica fume has crystalline phases. The crystalline phases have an amount of moissanite of at least 35 wt. % of the silica fume, an amount of iron silicon of at least 15 wt. % of the silica fume, an amount of andalusite of at least 30 wt. % of the silica fume, and an amount of cristobalite of at least 10 wt. % of the silica fume.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
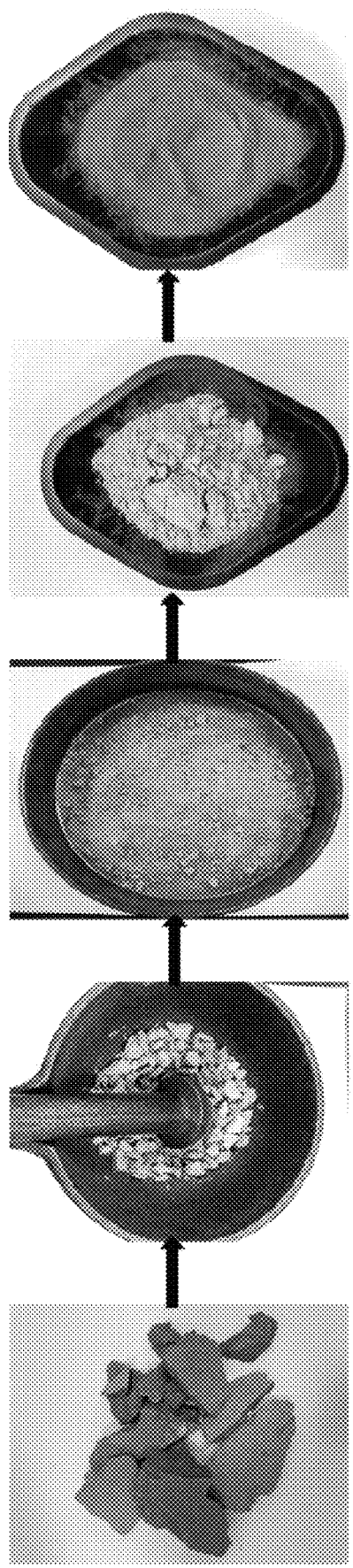
FIG. 1 shows stages of calcium bentonite calcination, according to one or more embodiments. From left a. Bentonite; b. Crushed Chips; c. Sieving, d. Raw Powder; e. Calcined Powder.

Aspects of this invention provide a method for zonal isolation in a well located in a geological formation, including calcining a calcium bentonite; mixing the calcined calcium bentonite with cement and water to form an admixture; mixing the calcined calcium bentonite to form a low-density cement slurry; and injecting the low-density cement slurry into the well to seal the well from the geological formation.

As used herein, the term, "geological formation" refers to a subterranean body of rock having a consistent set of physical characteristics that distinguishes it from adjacent bodies of rock, and which occupies a particular position in the layers of rock exposed in a geographical region.

As used herein, the term, "defoamer" refers to a foam control agent which may be added to a liquid system to reduce or eliminate the formation of foam or air bubbles and/or break foams. Non-limiting examples of defoamers include cetostearyl alcohol, lauryl alcohol, cetyl alcohol, stearyl alcohol, oleyl alcohol, decyl alcohol, dodecyl alcohol, and higher fatty alcohols.

As used herein, the term, "admixture" refers to a mixture of cementitious materials. As used herein, the term, "anti-settling agent" refers to a liquid chemical used for cements that holds cement and additives in suspension. The agent effectively prevents sedimentation and free-fluid formation in cement slurries.

As used herein, the term, "curing" refers to a process during which a chemical reaction (such as polymerization) or physical action (such as evaporation) takes place, resulting in a harder, tougher, or more stable linkage (such as an adhesive bond) or substance (such as concrete). Non-limiting examples of curing processes include water curing, wet covering, formwork curing, membrane curing, sheet curing, absorption heat curing, hot mixing, electrical curing, infrared curing, sand/sawdust covering, or natural curing.

As used herein, the term, "calcined" refers to heating (something, such as inorganic materials) to a high temperature but without fusing in order to drive off volatile matter or to effect changes (such as oxidation or pulverization).

As used herein, the term, "slurry" refers to a mixture of solids suspended in a liquid, usually water, that maintains a homogeneous mixture.

As used herein, the term "pozzolans" refers to a broad class of siliceous and aluminous materials which, in themselves, possess little or no cementitious value but which will, in finely divided form and in the presence of water, react chemically with calcium hydroxide ($Ca(OH)2$) to form compounds possessing cementitious properties. Non-limiting examples of pozzolans include calcined clay, calcined shale, metakaolin, kaolin clay, fly ash, rice husk ash, silica fume, bagasse ash, Portland cement, blast furnace slag, and pumice.

Aspects of present disclosure provide a method for zonal isolation in a well located in a geological formation, comprising: calcining a uncalcined calcium bentonite having $SiO_2$ in an amount of from 55 wt. % to 60 wt. %, preferably 55.5 wt. % to 59.5 wt. %, preferably 56 wt. % to 59 wt. %, preferably 56.5 wt. % to 58.5 wt. %, preferably 57 wt. % to 58 wt. %, or 57.5 wt. % based on the total weight of the uncalcined calcium bentonite. The uncalcined calcium bentonite has $Al_2O_3$ in an amount of from 15 wt. % to 20 wt. %, preferably 15.5 wt. % to 19.5 wt. %, preferably 16 wt. % to 19 wt. %, preferably 16.5 wt. % to 18.5 wt. %, preferably 17 wt. % to 18 wt. %, or 17.5 wt. % based on the total weight of the uncalcined calcium bentonite. The uncalcined calcium bentonite has $Fe_2O_3$ in an amount of from 10 wt. % to 15 wt. %, preferably 10.5 wt. % to 14.5 wt. %, preferably 11 wt. % to 14 wt. %, preferably 11.5 wt. % to 13.5 wt. %, preferably 12 wt. % to 13 wt. %, or 12.5 wt. % based on the total weight of the uncalcined calcium bentonite.

The uncalcined calcium bentonite is calcined to form a calcined calcium bentonite. The calcined calcium bentonite has $SiO_2$ in an amount of from 55 wt. % to 60 wt. %, preferably 55.5 wt. % to 59.5 wt. %, preferably 56 wt. % to 59 wt. %, preferably 56.5 wt. % to 58.5 wt. %, preferably 57 wt. % to 58 wt. %, or 57.5 wt. % based on the total weight of the calcined calcium bentonite. The calcined calcium bentonite has $Al_2O_3$ in an amount of from 19 wt. % to 24 wt. %, preferably 19.5 wt. % to 23.5 wt. %, preferably 20 wt. % to 23 wt. %, preferably 20.5 wt. % to 22.5 wt. %, preferably 21 wt. % to 22 wt. %, or 21.5 wt. % based on the total weight of the calcined calcium bentonite. The calcined calcium bentonite has $Fe_2O_3$ in an amount of from 15 wt. % to 19 wt. %, preferably 15.5 wt. % to 18.5 wt. %, preferably 16 wt. % to 18 wt. %, preferably 16.5 wt. % to 17.5 wt. %, or 17 wt. % based on the total weight of the calcined calcium bentonite.

The method further includes mixing the calcined calcium bentonite with cement to form an admixture; and the calcined calcium bentonite is present in the admixture in an amount of from 10 wt. % to 30 wt. %, preferably 12 wt. % to 28 wt. %, preferably 14 wt. % to 26 wt. %, preferably 16 wt. % to 24 wt. %, preferably 18 wt. % to 22 wt. %, or 20 wt. % based on the total weight of the admixture to form a low-density cement slurry. The low density slurry has a density of from 10 pounds per gallon (ppg) to 15 ppg, preferably 10.5 ppg to 14.5 ppg, preferably 11 ppg to 14 ppg, preferably 11.5 ppg to 13.5 ppg, preferably 12 ppg to 13 ppg, or 12.5 ppg. The low-density cement slurry is injected into the well to seal the well from the geological formation.

In some embodiments, the uncalcined calcium bentonite may contain $SiO_2$ in an amount of from 55 wt. % to 60 wt. % of the uncalcined calcium bentonite, preferably 55.5 wt. % to 59.5 wt. %, preferably 56 wt. % to 59 wt. %, preferably 56.5 wt. % to 58.5 wt. %, preferably 57 wt. % to 58 wt. %, or 57.5 wt. %; having $Al_2O_3$ in an amount of from 15 wt. % to 20 wt. %, of the uncalcined calcium bentonite, preferably 15.5 wt. % to 19.5 wt. %, preferably 16 wt. % to 19 wt. %, preferably 16.5 wt. % to 18.5 wt. %, preferably 17 wt. % to 18 wt. %, or 17.5 wt. %; and having $Fe_2O_3$ in an amount of from 10 wt. % to 15 wt. % of the uncalcined calcium bentonite, preferably 10.5 wt. % to 14.5 wt. %, preferably 11 wt. % to 14 wt. %, preferably 11.5 wt. % to 13.5 wt. %, preferably 12 wt. % to 13 wt. %, or 12.5 wt. % The calcined calcium bentonite has $SiO_2$ in an amount of from 55 wt. % to 60 wt. % of the calcined calcium bentonite, preferably 55.5 wt. % to 59.5 wt. %, preferably 56 wt. % to 59 wt. %, preferably 56.5 wt. % to 58.5 wt. %, preferably 57 wt. % to 58 wt. %, or 57.5 wt. %; $Al_2O_3$ in an amount of from 19 wt. % to 24 wt. % of the calcined calcium bentonite, preferably 19.5 wt. % to 23.5 wt. %, preferably 20 wt. % to 23 wt. %, preferably 20.5 wt. % to 22.5 wt. %, preferably 21 wt. % to 22 wt. %, or 21.5 wt. %; and $Fe_2O_3$ in an amount of from 15 wt. % to 19 wt. % of the calcined calcium bentonite, preferably 15.5 wt. % to 18.5 wt. %, preferably 16 wt. % to 18 wt. %, preferably 16.5 wt. % to 17.5 wt. %, or 17 wt. %; and mixing the calcined calcium bentonite with cement to form an admixture, wherein the mixing the calcined calcium bentonite occurs in an amount of from 10 wt. % to 30 wt. % of the admixture, preferably 11 wt. % to 29 wt. %, preferably 12 wt. % to 28 wt. %, preferably 13 wt. % to 27 wt. %, preferably 14 wt. % to 26 wt. %, preferably 15 wt. % to 25 wt. %, preferably 16 wt. % to 24 wt. %, preferably 17 wt. % to 23 wt. %, preferably 18 wt. % to 22 wt. %, preferably 19 wt. % to 21 wt. %, or 20 wt. % to form a low-density cement slurry at a density of from 10 pounds per gallon (ppg) to 15 ppg, preferably 10.5 ppg to 14.5 ppg, preferably 11 ppg to 14 ppg, preferably 11.5 ppg to 13.5 ppg, preferably 12 ppg to 13 ppg, preferably 12.5 ppg; and injecting the low-density cement slurry into the well to seal the well from the geological formation.

The calcined calcium bentonite in the slurry has a pozzolanic reaction with the cement to form a cured product having a strength activity of from 100% to 150% compared to a cement slurry that is the same but does not include the calcined calcium bentonite, preferably from more than 100% to 110%, preferably from 101% to 109%, preferably 102% to 108%, preferably 103% to 107%, preferably 104% to 106%, or 105%. The pozzolanic reaction can be described as a chemical reaction that converts a silica-rich precursor with no cementing properties to a calcium silicate with good cementing properties. In some embodiments, the cement used to catalyze the pozzolanic reaction can be a class N, class F, or class C pozzolan.

The method further includes curing the low-density cement slurry to seal the well from the geological formation. In some embodiments, the curing may take place for 24 hours to 48 hours, preferably 26 hours to 46 hours, preferably 28 hours to 44 hours, preferably 30 hours to 42 hours, preferably 32 hours to 40 hours, preferably 34 hours to 38 hours, or 36 hours. In some embodiments, the curing is at a bottomhole circulating temperature (BHCT) of from 100° F. to 250° F., preferably 110° F. to 240° F., preferably 120° F. to 230° F., preferably 130° F. to 220° F., preferably 140° F. to 210° F., preferably 150° F. to 200° F., preferably 160° F. to 190° F., preferably 170° F. to 180° F., or 175° F., a bottom hole static temperature (BHST) of from 160° F. to 300° F., preferably 170° F. to 290° F., preferably 180° F. to 280° F., preferably 190° F. to 270° F., preferably 200° F. to 260° F., preferably 210° F. to 250° F., preferably 220° F. to 240° F., or 230° F., and a bottom hole pressure (BHP) of from 2600 psi to 4000 psi, preferably 2700 psi to 3900 psi, preferably 2800 psi to 3800 psi, preferably 2900 psi to 3700 psi, preferably 3000 psi to 3600 psi, preferably 3100 psi to 3500 psi, preferably 3200 psi to 3400 psi, or 3300 psi. In some example embodiments, the curing is at a bottomhole circulating temperature (BHCT) of at least 100° F., a bottom hole static temperature (BHST) of at least 160° F., and a bottom hole pressure (BHP) of at least 2600 psi. In some example embodiments, the cement slurry has a thickening time of from 120 minutes to 175 minutes which is measured at a BHCT of at least 100° F., preferably 130 minutes to 170 minutes, preferably 140 minutes to 160 minutes, or 150 minutes. The BHCT can be described as the temperature of a circulating fluid (cement) at the bottom of the well after circulation of the fluid. The BHST can be described as the temperature at the bottom of a well without disturbance or circulation of a fluid. The BHP can be described as the pressure at the bottom of the well and is equal to a pressure drop of the tubing of the well plus the well head pressure.

The cured material formed after the low-density cement slurry is injected into the well and cured has a compressive strength of from 30,000 pounds per square inch (psi) to 60,000 psi, preferably 32,000 psi to 58,000 psi, preferably 34,000 psi to 56,000 psi, preferably 36,000 psi to 54,000 psi, preferably 38,000 psi to 52,000 psi, preferably 40,000 psi to 50,000 psi, preferably 42,000 psi to 48,000 psi, preferably 44,000 psi to 46,000 psi, or 45,000 psi at an effective pressure of 15,000 psi in the well.

In some embodiments, the uncalcined calcium bentonite is crushed, and ground from uncalcined calcium bentonite chips, and then calcined at a temperature of at least 830° C. for at least 3 hours. As depicted in FIG. 1, the uncalcined calcium bentonite chips are first calcined and undergo a color change to a lighter hue. Next, the calcined chips are crushed until a powder with some clumped aggregates forms. In some embodiments, more calcined chips are crushed to form more powder before grinding. The crushed powder with remaining aggregates is then ground until a fine powder is formed with no remaining clumps and having a homogenous powdered appearance. In some embodiments, the ground material has a $D_{50}$ diameter ranging from 10 μm to 500 μm, preferably 25 μm to 475 μm, preferably 50 μm to 450 μm, preferably 75 μm to 425 μm, preferably 100 μm to 400 μm, preferably 125 μm to 375 μm, preferably 150 μm to 350 μm, preferably 175 μm to 325 μm, preferably 200 μm to 300 μm, preferably 225 μm to 275 μm, or 250 μm. The $D_{50}$ diameter can be described as when the particle size reaches a cumulative percentage of 50%. For instance, a powder sample with a $D_{50}$ diameter of 5 μm means 50% of particles are larger than 5 μm and 50% particles are smaller than 5 μm. In some embodiments, the calcining of the uncalcined calcium bentonite chips occurs at a temperature of at least 830° C., preferably at least 840° C., preferably at least 850° C., preferably at least 860° C., preferably at least 870° C., preferably at least 880° C., preferably at least 890° C., or at least 900° C. for at least 3 hours, preferably at least 4 hours, preferably at least 8 hours, preferably at least 12 hours, preferably at least 16 hours, preferably at least 20 hours, or 24 hours. The bentonite changed its color from grey to reddish-brown upon heating, as shown in FIG. 1, last stage.

In some embodiments, the calcined calcium bentonite is further mixed with one or more of calcium chloride, an anti-settling agent, a defoamer, and an accelerator. In certain embodiments, the anti-settling agent is an organic clay, polyamide, acetate polymer, silica fume, or calcium sulfonate. In alternate embodiments, calcium chloride can be replaced with magnesium chloride, beryllium chloride, strontium chloride, barium chloride, scandium chloride, titanium chloride, zirconium chloride, or the like.

In certain embodiments, the slurry comprises the cement in an amount of from 70 wt. % to 90 wt. % of the slurry, preferably 71 wt. % to 89 wt. %, preferably 72 wt. % to 88 wt. %, preferably 73 wt. % to 87 wt. %, preferably 74 wt. % to 86 wt. %, preferably 75 wt. % to 85 wt. %, preferably 76 wt. % to 84 wt. %, preferably 77 wt. % to 83 wt. %, preferably 78 wt. % to 82 wt. %, preferably 79 wt. % to 81 wt. %, or 80 wt. %; an amount of the calcined calcium bentonite of from 10 wt. % to 30 wt. % of the slurry, preferably 11 wt. % to 29 wt. %, preferably 12 wt. % to 28 wt. %, preferably 13 wt. % to 27 wt. %, preferably 14 wt. % to 26 wt. %, preferably 15 wt. % to 25 wt. %, preferably 16 wt. % to 24 wt. %, preferably 17 wt. % to 23 wt. %, preferably 18 wt. % to 22 wt. %, preferably 19 wt. % to 21 wt. %, or 20 wt. %; an amount of the calcium chloride of at least 2.5 wt. % of the slurry, preferably at least 3 wt. %, preferably at least 3.5 wt. %, preferably 4 wt. %, preferably at least 4.5 wt. %, or 5 wt. %; an amount of the anti-settling agent of at least 2 wt. % of the slurry, preferably at least 2.5 wt. %, preferably at least 3 wt. %, preferably at least 3.5 wt. %, preferably 4 wt. %, preferably at least 4.5 wt. %, or 5 wt. %; at least 1 g of the defoamer, preferably at least 4 g, preferably at least 8 g, preferably 12 g, preferably at least 16 g, or 20 g and of from 617 g to 643 g of water, preferably 620 g to 640 g, preferably 625 g to 635 g, or 630 g of the total mass. In some embodiments, a ratio of $Na_2O/CaO$ in the uncalcined calcium bentonite is at least 1.1, preferably at least 1.15, preferably at least 1.2 preferably at least 1.25, or 1.3.

In some embodiments, the calcined calcium bentonite further contains an amount of CaO not greater than 2 wt. % of the calcined calcium bentonite, preferably no greater than 2.25 wt. %, preferably no greater than 2.5 wt. %, preferably no greater than 2.75 wt. %, preferably no greater than 3 wt. %, preferably no greater than 3.25 wt. %, preferably no greater than 3.5 wt. %, preferably no greater than 3.75 wt. %, or no greater than 4 wt. %; an amount of $K_2O$ not greater than 2 wt. % of the calcined calcium bentonite, preferably no greater than 2.25 wt. %, preferably no greater than 2.5 wt. %, preferably no greater than 2.75 wt. %, preferably no greater than 3 wt. %, preferably no greater than 3.25 wt. %, preferably no greater than 3.5 wt. %, preferably no greater than 3.75 wt. %, or no greater than 4 wt. %; an amount of $Na_2O$ not greater than 2 wt. % of the calcined calcium bentonite, preferably no greater than 2.25 wt. %, preferably no greater than 2.5 wt. %, preferably no greater than 2.75 wt. %, preferably no greater than 3 wt. %, preferably no greater than 3.25 wt. %, preferably no greater than 3.5 wt. %, preferably no greater than 3.75 wt. %, or no greater than 4 wt. %; an amount of MgO not greater than 2 wt. % of the calcined calcium bentonite, preferably no greater than 2.25 wt. %, preferably no greater than 2.5 wt. %, preferably no greater than 2.75 wt. %, preferably no greater than 3 wt. %, preferably no greater than 3.25 wt. %, preferably no greater than 3.5 wt. %, preferably no greater than 3.75 wt. %, or no greater than 4 wt. %; and an amount of $TiO_2$ not greater than 2 wt. % of the calcined calcium bentonite, preferably no greater than 2.25 wt. %, preferably no greater than 2.5 wt. %, preferably no greater than 2.75 wt. %, preferably no greater than 3 wt. %, preferably no greater than 3.25 wt. %, preferably no greater than 3.5 wt. %, preferably no greater than 3.75 wt. %, or no greater than 4 wt. %. In some embodiments, the uncalcined calcium bentonite has a density of from 2.5 $g/cm^3$ to 4 $g/cm^3$, preferably 2.6 $g/cm^3$ to 3.9 $g/cm^3$, preferably 2.7 $g/cm^3$ to 3.8 $g/cm^3$, preferably 2.8 $g/cm^3$ to 3.7 $g/cm^3$, preferably 2.9 $g/cm^3$ to 3.6 $g/cm^3$, preferably 3 $g/cm^3$ to 3.5 $g/cm^3$, preferably 3.1 $g/cm^3$ to 3.4 $g/cm^3$, preferably 3.2 $g/cm^3$ to 3.3 $g/cm^3$, or 3.25 $g/cm^3$. In some embodiments, the calcined calcium bentonite has a density of from 2.4 $g/cm^3$ to 3.5 $g/cm^3$, preferably 2.5 $g/cm^3$ to 3.4 $g/cm^3$, preferably 2.6 $g/cm^3$ to 3.3 $g/cm^3$, preferably 2.7 $g/cm^3$ to 3.2 $g/cm^3$, preferably 2.8 $g/cm^3$ to 3.1 $g/cm^3$, preferably 2.9 $g/cm^3$ to 3.0 $g/cm^3$, or 2.95 $g/cm^3$ In some embodiments, the calcined calcium bentonite has crystalline phases having an amount of quartz of at least 65 wt. % of the calcined calcium bentonite, preferably at least 66 wt %, preferably at least 67 wt. %, preferably at least 68 wt. %, preferably 69 wt. %, preferably at least 70 wt. %, preferably at least 71 wt. %, preferably at least 72 wt. %, preferably at least 73 wt. %; an amount of illite of at least 15 wt. % of the calcined calcium bentonite, preferably at least 16 wt. %, preferably at least 17 wt. %, preferably at least 18 wt. %, preferably 19 wt. %, preferably at least 20 wt. %, preferably at least 21 wt. %, preferably at least 22 wt. %, preferably at least 23 wt. %; and an amount of kaolinite of at least 12 wt. % of the calcined calcium bentonite, preferably at least 13 wt. %, preferably at least 14 wt. %, preferably at, least 15 wt. %, preferably 16 wt. %. preferably at least 7 wt. %, preferably at least 18 wt. %, preferably at least 19 wt. %, or at least 20 wt. %.

Figure 2A:
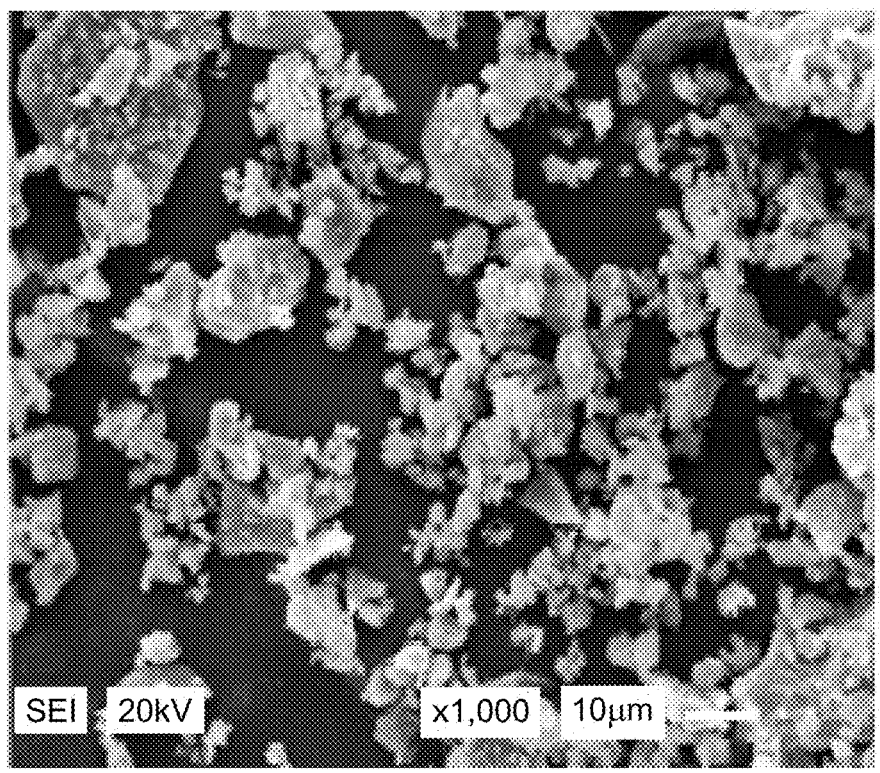
FIG. 2A shows Scanning Electron Microscopy (SEM) images of cement, according to one or more embodiments.
Figure 2B:
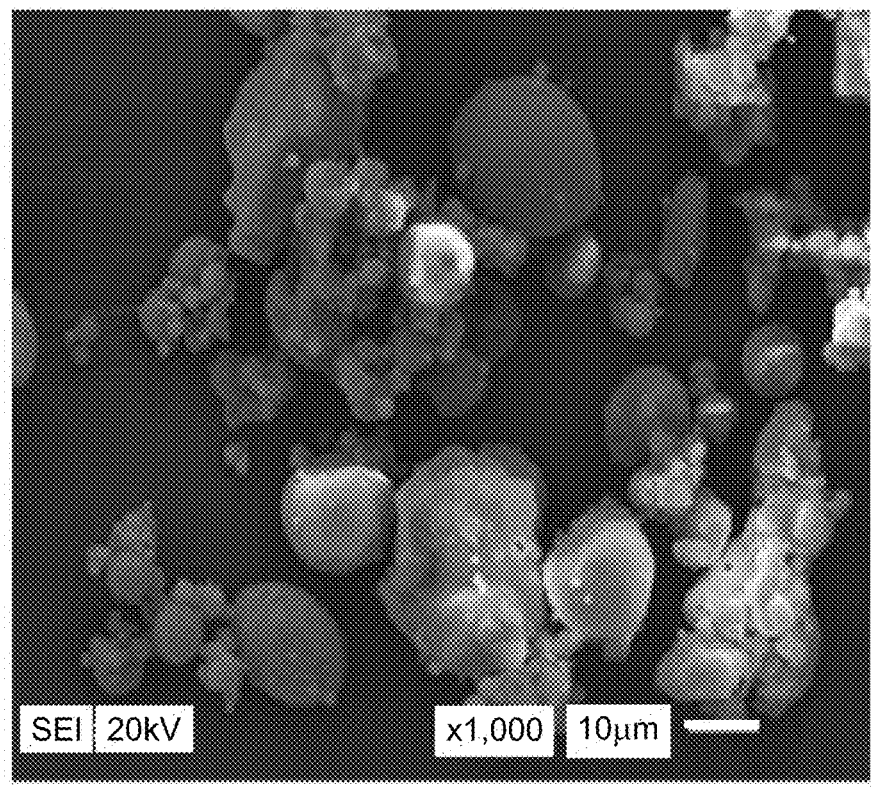
FIG. 2B shows SEM images of fly-ash, according to one or more embodiments.
Figure 2C:
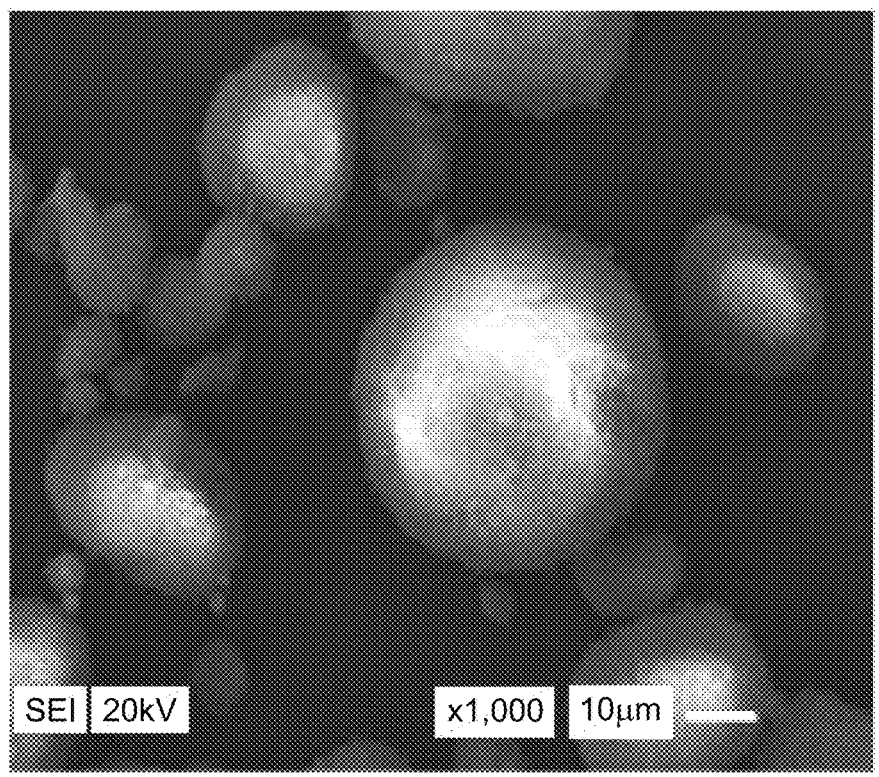
FIG. 2C shows SEM images of silica fume, according to one or more embodiments.
Figure 2D:
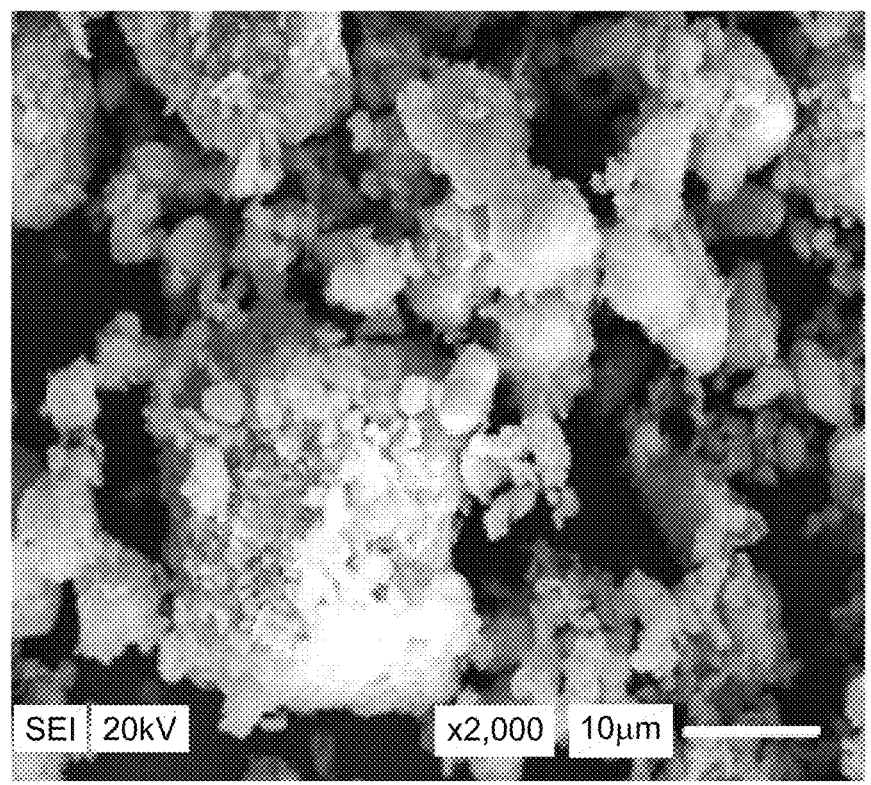
FIG. 2D shows SEM images of uncalcined Saudi calcium bentonite powder, according to one or more embodiments.
Figure 2E:
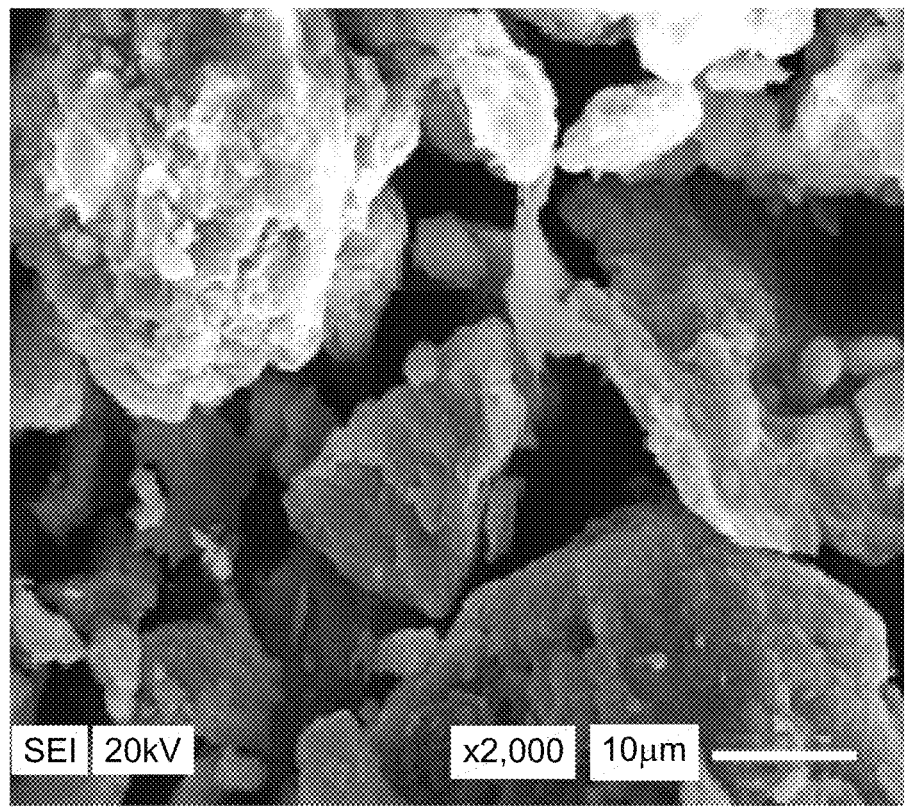
FIG. 2E shows SEM images of calcined Saudi bentonite powder, according to one or more embodiments.

As depicted in FIG. 2E, there are two distinct phases of particles present in the calcined calcium bentonite. The first phase, represented by the plate-like, rectangular particles have a higher quartz content, giving the particles a more rigid, defined morphology. In some embodiments, the particles of the calcined calcium bentonite have a length of from 5 μm to 30 μm, preferably 7.5 μm to 27.5 μm, preferably 10 μm to 25 μm, preferably 12.5 μm to 22.5 μm, preferably 15 μm to 20 μm, or 17.5 μm. The second phase, represented by the spherical, clumped particles have a lesser quartz content, giving the particles a looser morphology and increasing the extent to which the particles can coalesce with one another. Because the second phase has a lesser quartz content, it has a less rigid lattice pattern formed throughout the particles than another lattice formed with a higher quartz content. The hardness of the quartz imparts a strong network for particles to use as a rigid boundary between neighboring particles. Phases with lesser quartz content will not display such a defined boundary between particles, and as such will increase the ability to which neighboring particles can coalesce with one another without the strong network of the quartz. In some embodiments, particles of the calcined calcium bentonite are in the form of an irregularly shaped flaky sheet. As shown in FIG. 2E, the plate-like phase can further be described as an irregularly flaky sheet, not substantially rectangular in shape, with protrusions and ridges present on the surface of the particles resembling a flake-like appearance.

In some embodiments, the low-density cement slurry after the curing has a tensile strength of at least 70 pounds per square inch (psi), preferably at least 75 psi, preferably at least 80 psi, preferably at least 85 psi, preferably at least 90 psi, preferably at least 95 psi, or 100 psi. Tensile strength can be defined as its capacity to resist cracking or breaking under tension.

In some embodiments, no more than 0.55 kilograms of water per square meter should escape from the cured low-density cement slurry in 72 hours, preferably no more than 0.525 kg, preferably no more than 0.5 kg, preferably no more than 0.475 kg, preferably no more than 0.45 kg, preferably no more than 0.425 kg, preferably no more than 0.4 kg, preferably no more than 0.375 kg, preferably no more than 0.35 kg, preferably no more than 0.325 kg, or no more than 0.3 kg.

In some embodiments, the low-density cement slurry after the curing has a Young's modulus of at least 10 GPa, preferably at least 15 GPa, preferably at least 20 GPa, preferably at least 25 GPa, preferably at least 30 GPa, or at least 35 GPa. The Young's modulus can be described as the elastic properties of a solid undergoing tension or compression in only one direction, measure of the ability of a material to withstand changes in length when under lengthwise tension or compression.

In some embodiments, the low-density cement slurry after the curing has a porosity of at least 0.55 porosity units, preferably at least 0.6 porosity units, preferably at least 0.65 porosity units, preferably at least 0.7 porosity units, preferably at least 0.75 porosity units, preferably at least 0.8 porosity units, preferably at least 0.85 porosity units, preferably at least 0.9 porosity units, preferably at least 0.95 porosity units, or 1 porosity unit. Porosity can be expressed as a percentage the relationship of the volume of open pores in the test specimen to its exterior volume. Porosity units is the fraction of volume of voids over the total volume ranging from 0 to 1. In some embodiments, the low-density cement slurry after the curing has a pore size distribution ranging from 1 μm to 50 μm, preferably 5 μm to 45 μm, preferably 10 μm to 40 μm, preferably 15 μm to 35 μm, preferably 20 μm to 30 μm, or 25 μm. The pore size can be defined as the mean size of the material's pores, or voids.

In some embodiments, the method further comprises adding an amount of silica fume of from 5 wt. % to 10 wt. % of the admixture to the low-density cement slurry, preferably 5.5 wt. % to 9.5 wt. %, preferably 6 wt. % to 9 wt. %, preferably 6.5 wt. % to 8.5 wt. %, preferably 7 wt. % to 8 wt. %, or 7.5 wt. % to form a well cement system. In some embodiments, the method includes injecting the well cement system into the well to seal the well from the geological formation.

The method further comprises curing the well cement system to seal the well from the geological formation. The curing may take place for 24 hours to 72 hours, preferably 28 hours to 68 hours, preferably 32 hours to 64 hours, preferably 36 hours to 60 hours, preferably 40 hours to 56 hours, preferably 44 hours to 52 hours, or 48 hours. In some embodiments, the curing is at a bottomhole circulating temperature (BHCT) of from 100° F. to 200° F., preferably 110° F. to 190° F., preferably 120° F. to 180° F., preferably 130° F. to 170° F., preferably 140° F. to 160° F., or 150° F., a bottom hole static temperature (BHST) of from 150° F. to 350° F., preferably 160° F. to 240° F., preferably 170° F. to 230° F., preferably 180° F. to 220° F., preferably 190° F. to 210° F., or 200° F., and a bottom hole pressure (BHP) of from 2000 psi to 3000 psi, preferably 2100 psi to 2900 psi, preferably 2200 psi to 2800 psi, preferably 2300 psi to 2700 psi, preferably 2400 psi to 2600 psi, or 2500 psi In some embodiments, the method includes adding an amount of silica fume of 5 wt. % silica fume to a 20 wt. % admixture, preferably 6 wt. % to 19 wt. %, preferably 7 wt. % to 18 wt. %, preferably 8 wt. % to 17 wt. %, preferably 9 wt. % to 16 wt. %, preferably 10 wt. % to 15 wt. %, preferably 11 wt. % to 16 wt. %, preferably 12 wt. % to 15 wt. %, preferably 13 wt. % to 14 wt. %, or 13.5 wt. %, increases an ultrasonic cement analyzer (UCA strength) of the mixture by at least 50 psi when compared to a 20 wt. % calcined calcium bentonite cement slurry without silica fume, preferably at least 60 psi, preferably at least 70 psi, preferably at least 80 psi, preferably at least 90 psi, or at least 100 psi.

The ultrasonic cement analyzer Measures the travel time of ultrasonic enemy through a cement sample as it cures under simulated high temperature and high-pressure conditions.

In some embodiments, the admixture with the 5 wt. % silica fume has a UCA strength of from 400 psi to 600 psi, preferably 410 psi to 590 psi, preferably 420 psi to 580 psi, preferably 430 psi to 570 psi, preferably 440 psi to 560 psi, preferably 450 psi to 550 psi, preferably 460 psi to 540 psi, preferably 470 psi to 530 psi, preferably 480 psi to 520 psi, preferably 490 psi to 510 psi, or 500 psi.

In some embodiments, adding an amount of silica fume of 10 wt. % silica fume to a 20 wt. % admixture increases an ultrasonic cement analyzer (UCA strength) of the admixture by at least 190 psi when compared to a 20 wt. % admixture without silica fume, preferably at least 200 psi, preferably at least 225 psi, or at least 250 psi. In some embodiments, the UCA analyzer can measure concrete samples in a temperature range from 0° F. to 400° F., preferably 25° F. to 375° F., preferably 50° F. to 350° F., preferably 75° F. to 325° F., preferably 100° F. to 300° F., preferably 125° F. to 275° F., preferably 150° F. to 250° F., preferably 175° F. to 225° F., or 200° F. In some embodiments, the UCA analyzer can measure concrete samples in a pressure range of 10 psi to 10,000 psi, preferably 1,000 psi to 9,000 psi, preferably 2,000 psi to 8,000 psi, preferably, preferably 3,000 psi to 7,000 psi, preferably 4,000 psi to 6,000 psi, or 5,000 psi.

In some embodiments, the admixture with the 10 wt. % silica fume has a UCA strength of at least 550 psi, preferably at least 560 psi, preferably at least 570 psi, preferably at least 580 psi, preferably at least 590 psi, or at least 600 psi.

In some embodiments, particles of the silica fume have a spherical shape. As depicted in FIG. 2C, the silica fume particles are spherical without any substantial rough edges or curves around the circumference of the particle.

As seen in FIG. 2C, the silica fume has two distinct phases. The first phase, represented by the larger spherical particles with an encapsulated sphere within a larger encompassed sphere, has a larger amount of cristobalite, leading the encapsulated sphere arrangement described. The second phase, represented by the smaller spherical particles without encapsulation, has a smaller amount of cristobalite, leading to a hollow spherical arrangement.

In some embodiments, the silica fume has an amount of $SiO_2$ of from 90 wt. % to 95 wt. % of the silica fume, preferably 90.5 wt. % to 94.5 wt. %, preferably 91 wt. % to 94 wt. %, preferably 91.5 wt. % to 93.5 wt. %, preferably 92 wt. % to 93 wt. %, or 92.5 wt. %; an amount of $Al_2O_3$ of from 0.5 wt. % to 1 wt. % of the silica fume, preferably 0.55 wt. % to 0.95 wt. %, preferably 0.6 wt. % to 0.9 wt. %, preferably 0.65 wt. % to 0.85 wt. %, preferably 0.7 wt. % to 0.8 wt. %, or 0.75 wt. %; and an amount of $Fe_2O_3$ of from 3 wt. % to 5 wt. % of the silica fume, preferably 3.2 wt. % to 4.8 wt. %, preferably 3.4 wt. % to 4.6 wt. %, preferably 3.6 wt. % to 4.4 wt. %, preferably 3.8 wt. % to 4.2 wt. %, or 4 wt. %. In some embodiments, the silica fume has a density of at least 2.4 g/cm$^3$, preferably at least 2.5 g/cm$^3$, preferably at least 2.6 g/cm$^3$, preferably at least 2.7 g/cm$^3$, preferably at least 2.8 g/cm$^3$, preferably at least 2.9 g/cm$^3$, or at least 3 g/cm$^3$.

In some embodiments, the silica fume has crystalline phases having an amount of moissanite of at least 35 wt. % of the silica fume, preferably at least 36 wt. %, preferably at least 37 wt. %, preferably at least 38 wt. %, preferably 39 wt. %, preferably at least 40 wt. %, preferably at least 41 wt. %, preferably at least 42 wt. %, preferably at least 43 wt. %, preferably 44 wt. %, or at least 45 wt. %; an amount of iron silicon of at least 15 wt. % of the silica fume, preferably at least 16 wt. %, preferably at least 17 wt. %, preferably at least 18 wt. %, preferably 19 wt. %, preferably at least 20 wt. %, preferably at least 21 wt. %, preferably at least 22 wt. %, preferably at least 23 wt. %, preferably 24 wt. %, or at least 25 wt. %; an amount of andalusite of at least 30 wt. % of the silica fume, preferably at least 31 wt. %, preferably at least 32 wt. %, preferably at least 33 wt. %, preferably 34 wt. %, preferably at least 35 wt. %, preferably at least 36 wt. %, preferably at least 37 wt. %, preferably at least 38 wt. %, preferably 39 wt. %, or at least 40 wt. %; and an amount of cristobalite of at least 10 wt. % of the silica fume, preferably at least 11 wt. %, preferably at least 12 wt. %, preferably at least 13 wt. %, preferably 14 wt. %, preferably at least 15 wt. %, preferably at least 16 wt. %, preferably at least 17 wt. %, preferably at least 18 wt. %, preferably 19 wt. %, or at least 20 wt. %.

EXAMPLES

Selection of Desired Bentonite Replacement Ratio

Figure 4:
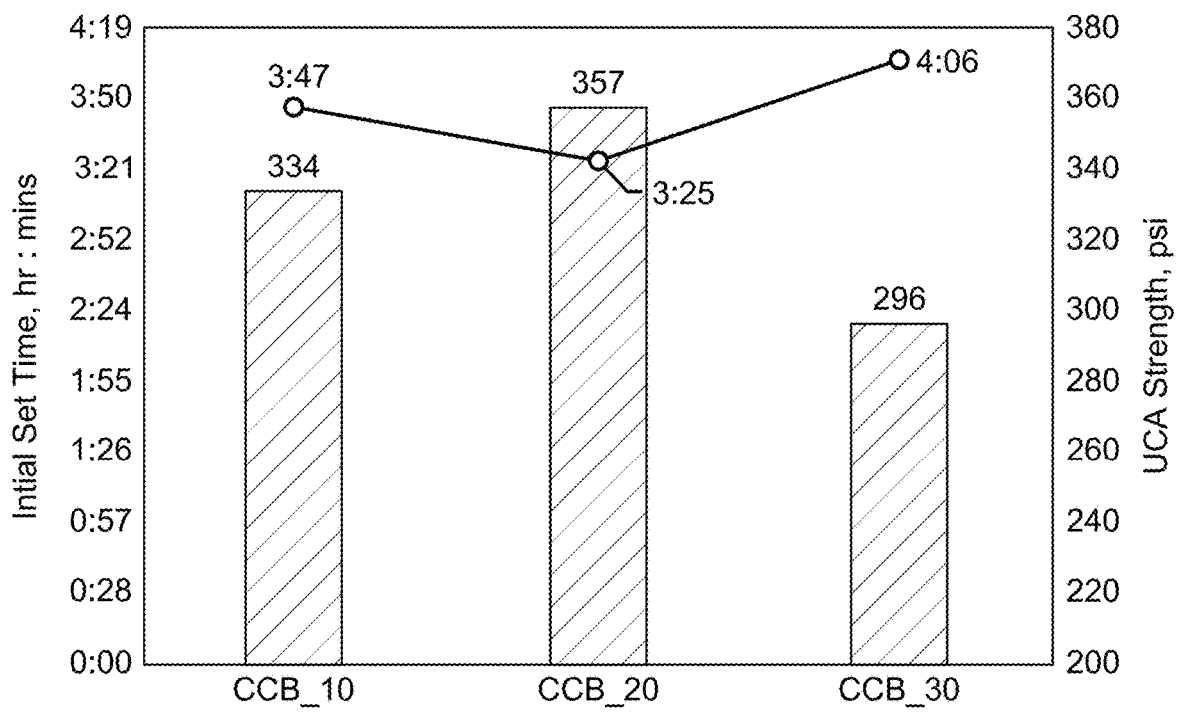
FIG. 4 shows UCA Strength of the Saudi calcium bentonite-based cement systems, according to one or more embodiments.

A study was performed to investigate the desired amount of the Saudi calcium bentonite required for higher performance. The 24-hour compressive strength evaluated with the ultrasonic cement analyzer (UCA strength), was used as the criteria for the selection. The results are shown in FIG. 4. The UCA strength increased from 334 psi for 10% to 357 psi for 20% cement replacement. However, the compressive strength for the lightweight composite containing 30% calcined calcium bentonite was reduced to 296 psi. The lower strength at 30% cement replacement was due to the low reactivity of the calcined clay coupled with the reduction in the quantity of the early-age reactive phase ($C_3S$) in the cement responsible for hydration. The time required to achieve the initial set time was quicker in the 20% system (CCB_20) in comparison to the other systems. The initial set time is the time required to attain a compressive strength of 50 psi. This strength is enough for the cement to support the casing as disclosed by Adjei and Elkatatny (see Overview of the Lightweight Oil-Well Cement Mechanical Properties for Shallow Wells. J. Pet. Sci. Eng. 108201), of which the entire disclosure is incorporated herein by reference.

Comparative Analysis of Calcined Bentonite and Fly Ash Based Cement Systems

The initial study based on the UCA strength indicated that the 20% cement replacement was the desired cement replacement ratio for the Saudi calcium bentonite in the design of low-density cement design. A 12.5 ppg cement system was designed using fly ash at 20% cement replacement (FA_20) for comparative analysis. The mix design is shown in Table 1. The designed cement systems were cured using two methods: in a UCA at 50° C. and 1000 psi and a water bath at 50° C.

TABLE 1

| Mix design for comparative analysis. | | |
|---|---|---|
| Material | CCB_20 | FA_20 |
| Cement, % | 80 | 80 |
| Lightweight Material, % | 20 | 20 |

TABLE 1-continued

| Mix design for comparative analysis. | | |
|---|---|---|
| Material | CCB_20 | FA_20 |
| Calcium Chloride, % | 2.5 | 2.5 |
| Anti-Settling Agent, % | 2 | 2 |
| Defoamer, g | 1 | 1 |
| Water, g | 630 | 600 |

Investigation of Pozzolanic Reactivity of Calcined Calcium Bentonite and Fly Ash For low calcium-based pozzolans such as calcined calcium bentonite and fly ash, their reactivity can be investigated by determining the amount of portlandite consumed. The XRD and thermogravimetry analysis (TGA) techniques offer the means to study this pozzolanic reaction. The TGA is an established thermal technique that measures the weight loss of the sample as a function of temperature or time.

The tests were performed on the 12.5 ppg calcined calcium bentonite and fly ash-based-cement samples that were cured for 48 hours at 50° C., dried at 105° C. for 16 hours, and ground into powder form.

Figure 5:
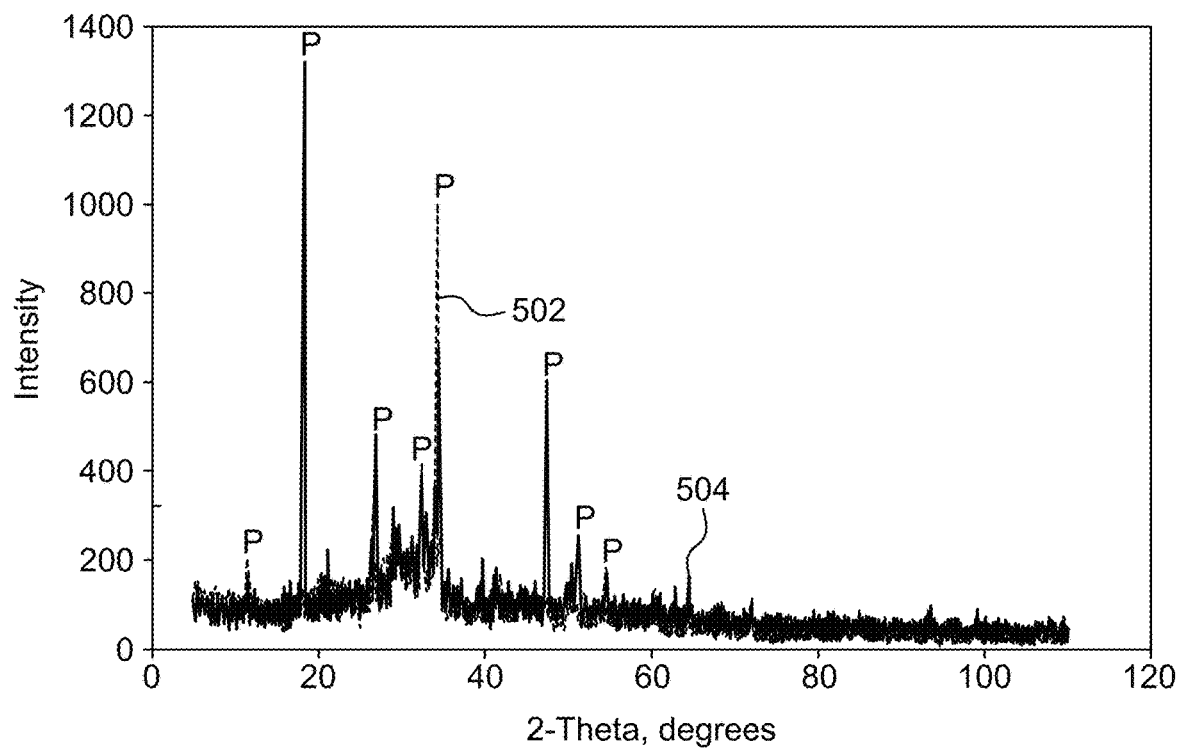
FIG. 5 shows XRD analysis of portlandite content in CCB_20 and FA_20 samples, according to one or more embodiments.

The x-ray diffractograms of the cement systems are shown in FIG. 5. The hump at 20° to 40° (for example, 502) indicates the presence of amorphous compounds. The peaks corresponding to the portlandite (P) are those of interest in this section. The intensity of the peaks can be used as a qualitative measure of pozzolanic reactivity. It can be observed that except for the peaks at 2-theta angles of 11.38°, 32.31°, and 34.26°, all the other peaks were almost identical (for example, 504), an indication of similar portlandite consumption rate of the calcined calcium bentonite and fly ash.

Figure 6:
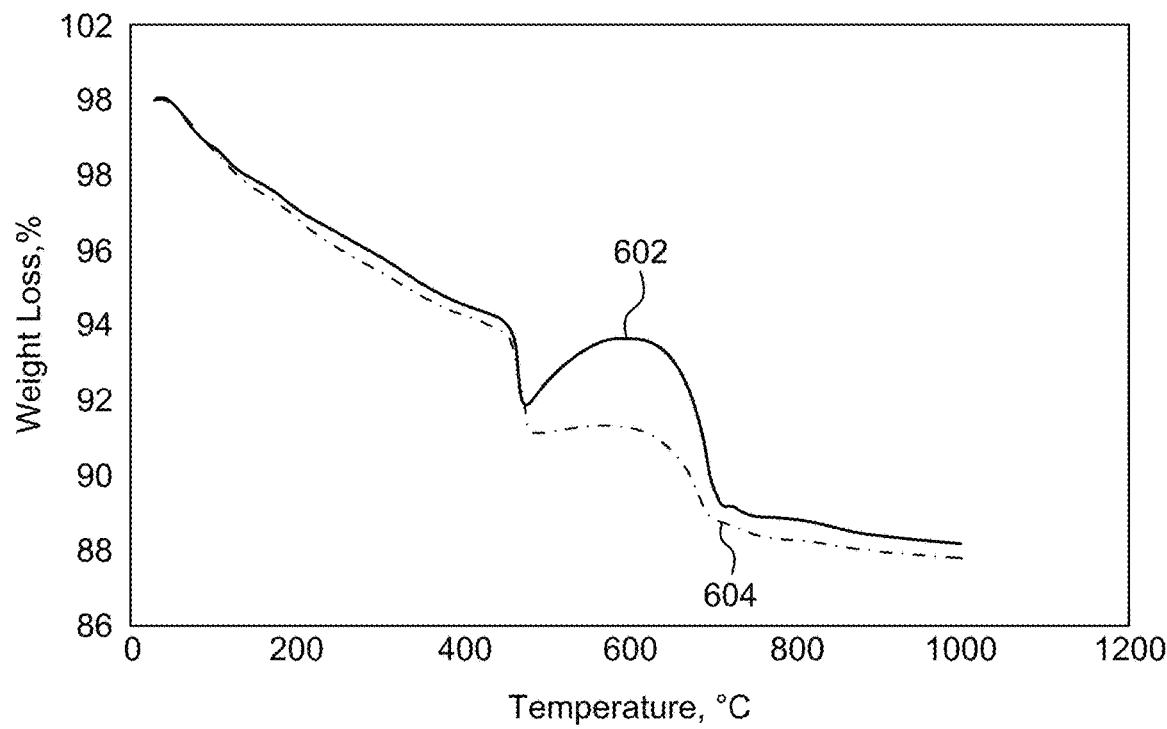
FIG. 6 shows thermograms of CCB_20 and FA_20 cement samples, according to one or more embodiments.

FIG. 6 compares the thermograms of the CCB_20 and FA_20 systems. The weight loss trend was observed to be similar in both systems (602 and 604). The cement samples were dried at 105° C. for about 16 hrs. and hence the weight loss at 70° C. to 130° C. could not be captured. This weight loss is mainly caused by the dehydration of the calcium silicate hydrate (C—S—H). The weight loss around 455° C.-473° C. is the main point of interest here. This loss is linked with the dehydroxylation of portlandite. In the CCB_20 cement, the loss in weight due to dehydroxylation of the portlandite was 2.0% and it was 2.73% in the FA_20. This is an indication that both materials exhibit very similar pozzolanic reactivity.

Rheological Studies

The rheological behavior of the slurry formulations for the comparative study was measured at room conditions. The up and down dial readings are presented in Table 2. All the systems investigated exhibited similar low rheology common to lightweight cement systems.

TABLE 2

| Rheological studies (Up/Down dial readings). | | |
|---|---|---|
| RPM | CCB_20 | FA_20 |
| 3 | 19/11 | 12/12 |
| 6 | 17/14 | 16/22 |
| 100 | 104/69 | 119/70 |
| 200 | 107/78 | 88/75 |
| 300 | 94/94 | 82/88 |

Thickening Time

Figure 7:
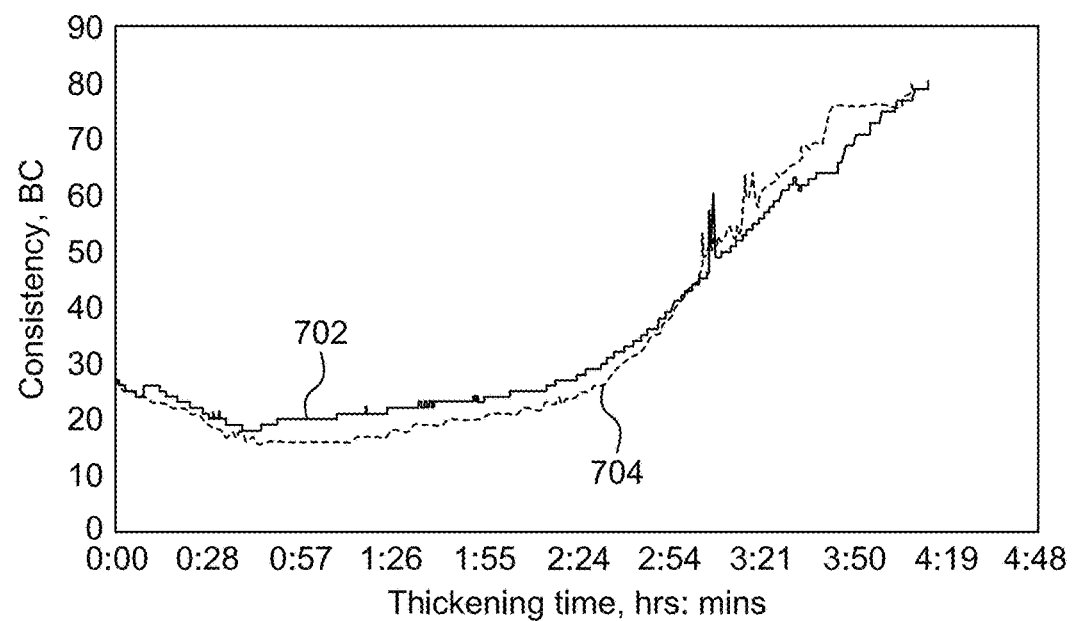
FIG. 7 shows thickening times at 70 BC, according to one or more embodiments.

The slurry consistency, BC (Bearden consistency), is an indicator of how easily the slurry could be pumped. For consistency of 100 BC and above, the slurry hardens. The thickening time when cement slurry reaches 70 BC is often used to indicate how long it would take the slurry to remain in the fluid state. For shallow intervals, the time to reach 70 BC is preferred to not exceed 6 hours. The time to 70 BC should also not be too low to allow sufficient cement placement. The consistency versus time curves (702 and 704) are shown in FIG. 7. The results of slurry consistency measured at 43° C. and 1000 psi indicate that the system containing the Saudi calcium bentonite had similar behavior in comparison to the fly ash system, all having thickening time in the range of 3 hr. 40 mins to 3 hr. 50 mins. Also, both systems had an initial consistency of 27 BC.

In oil-well cementing, the early-age mechanical properties of the cement sheath are very important. For instance, the sheath should achieve a compressive strength of at least 50 psi to enable it to support the casing and withstand stresses from other operations. The mechanical characteristics of the cured cement investigated at 24 hours were compressive strength and brittleness (tensile strength).

Compressive Strength

Figure 8:
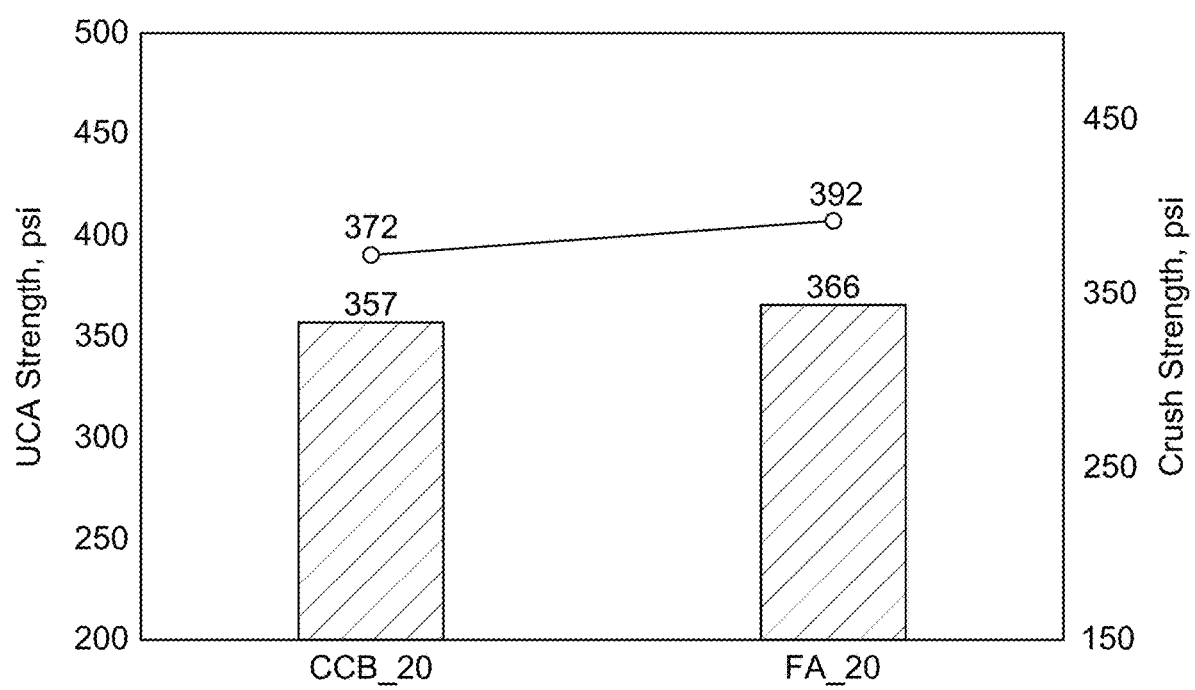
FIG. 8 shows the 24-hour compressive strength of the designed cement systems measured using both the ultrasonic cement analyzer (UCA) and the hydraulic press, according to one or more embodiments.

The 24-hour compressive strength of the designed cement systems measured using both the ultrasonic cement analyzer (UCA) and the hydraulic press is shown in FIG. 8. The results of the crush strength are the average of three values obtained from the hydraulic press method. The close match in the values for both methods of measuring the compressive strength confirms the accuracy of the UCA signal and the compressive strength measured. The compressive strength of the calcium bentonite system was comparable to the fly ash system, having the strength to be only about 2.5%-6% lower than the fly ash-based cement. The role of pozzolans in cement strength development occurs in two ways, the first is due to their filler effect because of their size. Finer particles fill voids in the matrix and provide a large surface area for the nucleation of C—S—H. Secondly, the C—S—H is formed through the pozzolanic reaction resulting in a gel. The gel also occupies the void spaces, improves matrix density, and hence compressive strength.

Brittleness of Cement

Cement-based materials are mostly brittle implying that they easily develop cracks under stress as disclosed by Song et al. in Synergistic Effect of Latex Powder and Rubber on the Properties of Oil Well Cement-Based Composites. Adv. Mater. Sci. Eng.), the entire disclosure is incorporated herein by reference. The tensile strength is a measure of the brittleness of a hardened cement composite. Higher tensile strength means the cement is ductile or has high toughness and hence higher stress is required to crack the cement system. The presence of cracks reduces the ability of the cement matrix to support loads as disclosed by Mazloom and Salehi in The Relationship Between Fracture Toughness and Compressive Strength of Self-Compacting Lightweight Concrete, in: IOP Conference Series: Materials Science and Engineering), the entire disclosure is incorporated herein by reference.

Figure 9:
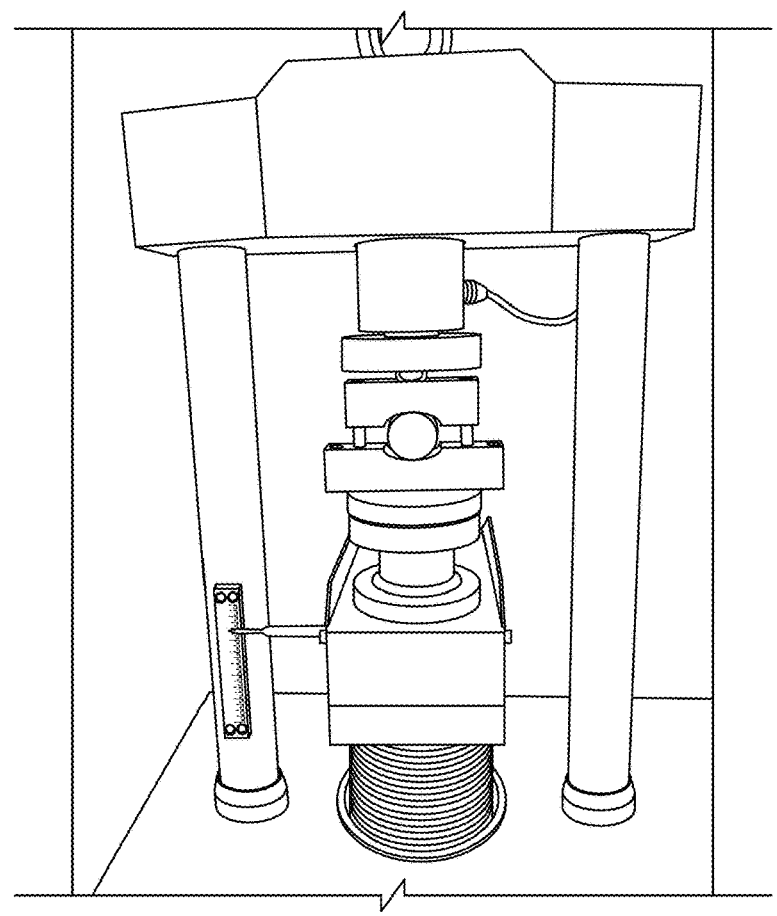
FIG. 9 shows equipment used for the Splitting Tensile Strength Test, according to one or more embodiments.
Figure 10:
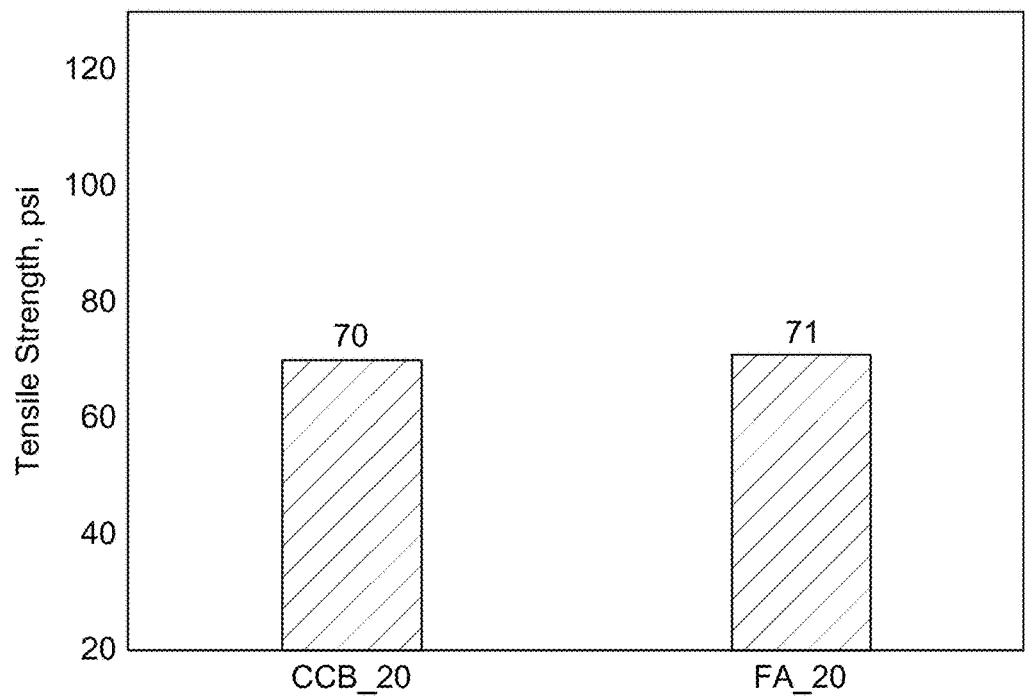
FIG. 10 shows tensile strength of samples measured using the Splitting Tensile Strength Test, according to one or more embodiments.

The tensile strength was measured using the Splitting Tensile Strength Test (FIG. 9). Cylindrical cement cores of length 0.75 inches and a diameter of 1.5 inches were used for this test. The average of three samples is shown in FIG. 10. As observed, there was not much difference in the tensile strength of the calcined bentonite and fly ash cement systems. A similar observation was reported in the compressive strength measurements. The results indicate that the calcined calcium bentonite has a close performance to the fly ash and would be a suitable replacement.

Pore Space Investigation

The pore space of the cement systems designed with the calcined calcium bentonite and fly ash was analyzed using the GeoSpec2 Rock Analyzer supplied by Oxford Industries. Pore space analysis using the nuclear magnetic resonance (NMR) approach has proven to be an effective technique due to its ability to pick up very tiny pores, as disclosed by Bowers, M. C., Ehrlich, R., Howard, J. J., Kenyon, W. E., 1995. Determination of Porosity Types from NMR Data and their Relationship to Porosity Types Derived from Thin Section, the entire disclosure is incorporated herein by reference.

Figure 11A:
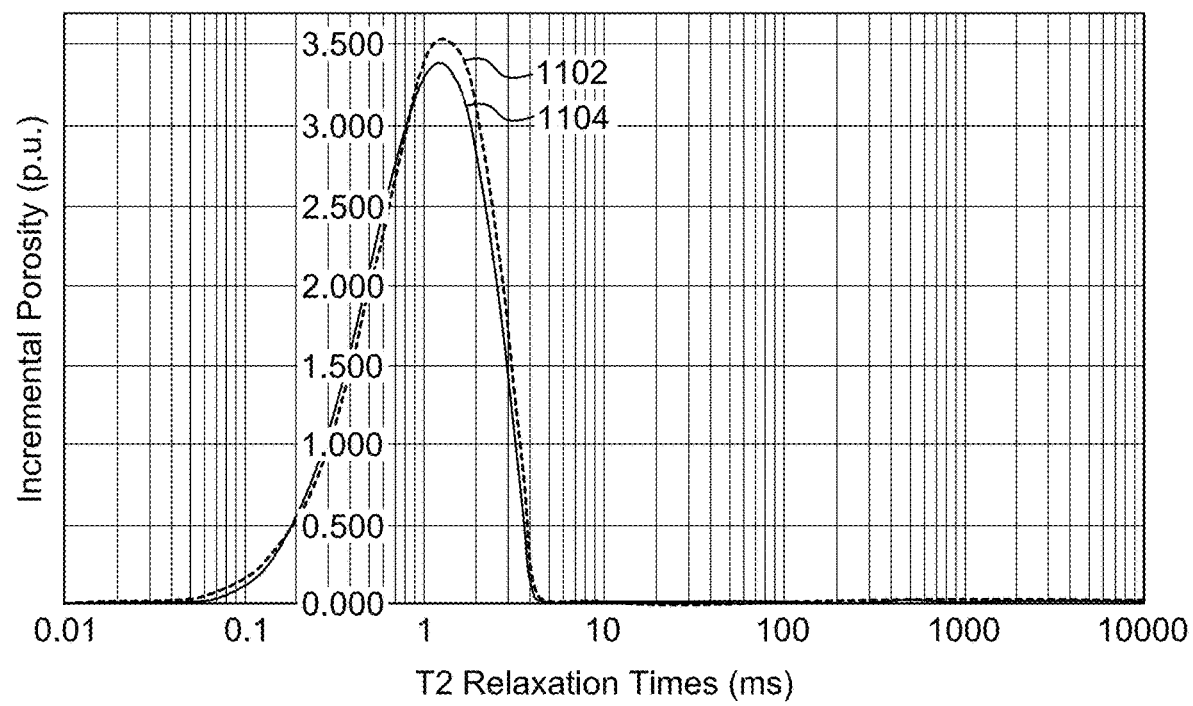
FIGS. 11A and 11B show the pore size distribution (a) and the associated cumulative porosity (b) plots of CCB_20 and FA_20 systems, according to one or more embodiments.
Figure 11B:
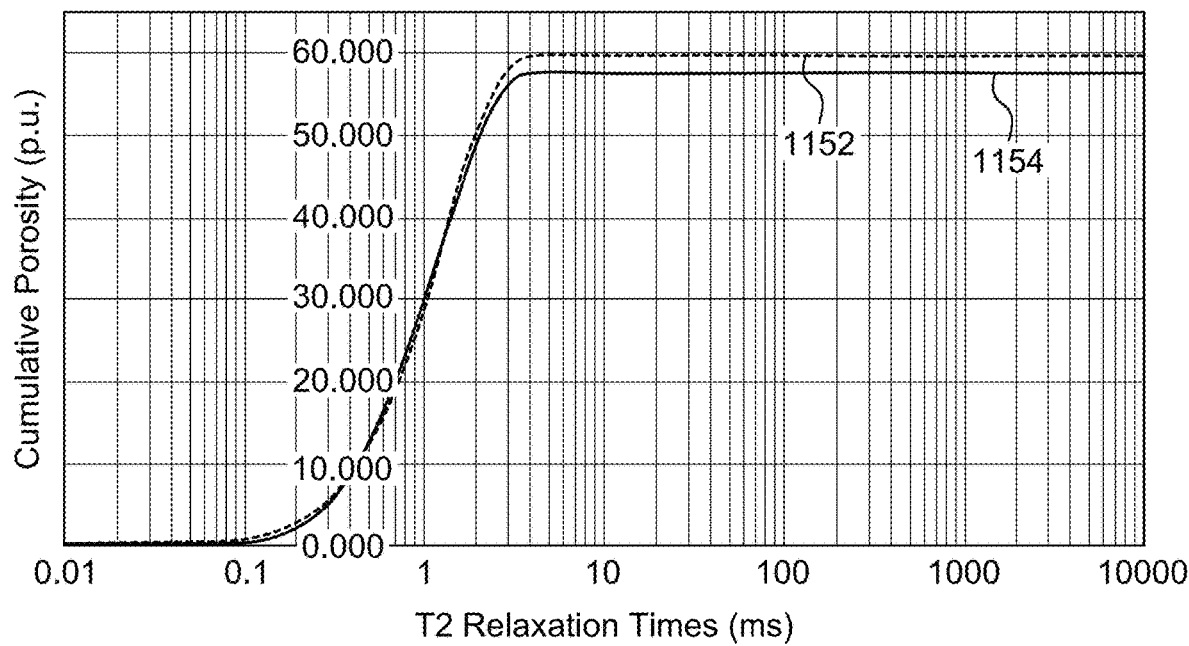

The pore size distribution (1102, 1104) and the associated cumulative porosity plots (1152, 1154) are shown in FIG. 11. It is observed that both cement systems exhibit similar pore size distribution. The CCB_20 cement sample had a total porosity of approximately 0.59, which was only 3.51% higher than that designed with the fly ash, FA_20.

Analysis of Hydration Products of 24-Hour Cured Samples

Figure 12A:
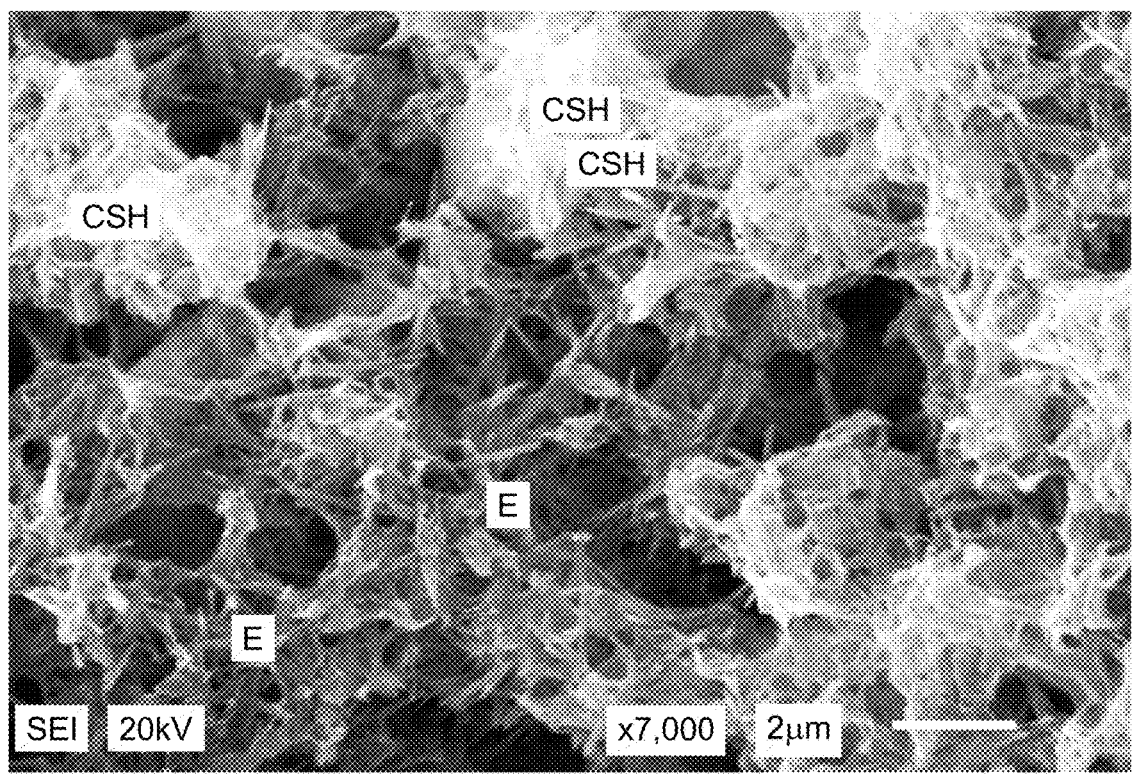
FIGS. 12A and 12B show the morphology of CCB_20 and FA_20 cement systems showing hydration products CSH, ettringite (E), and portlandite and EDS graph from a certain portion of the hardened samples, according to one or more embodiments.
Figure 12A:
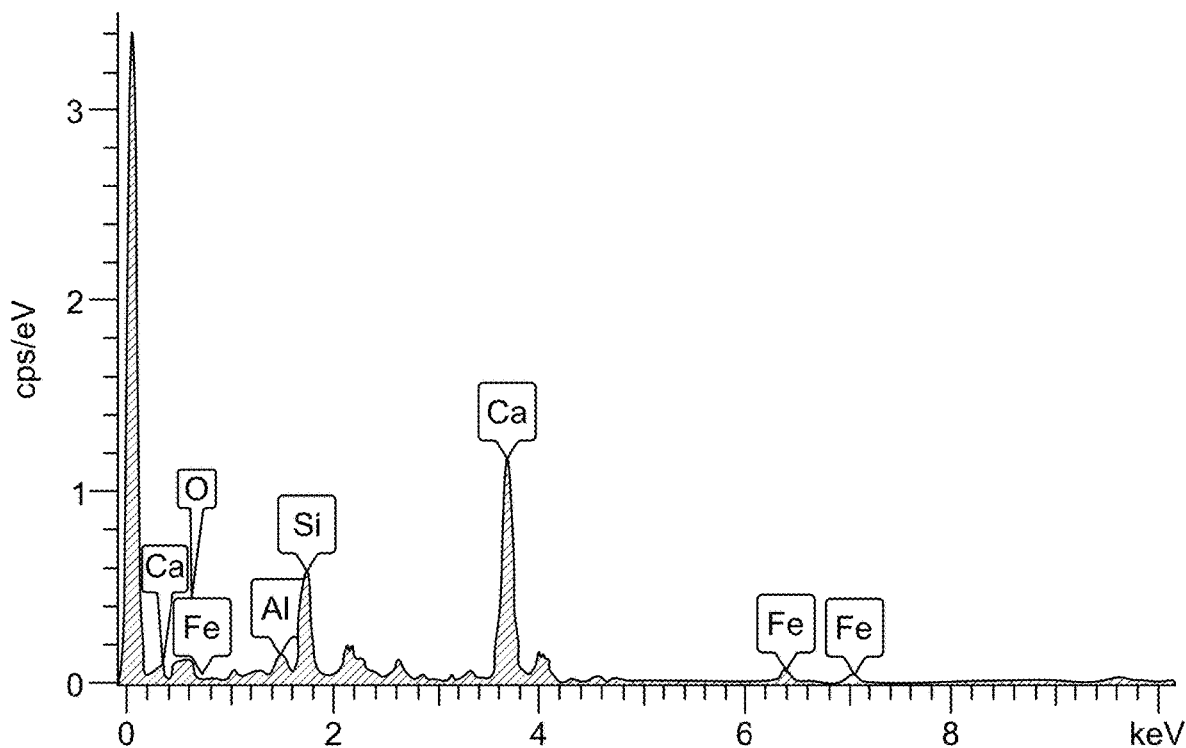
Figure 12B:
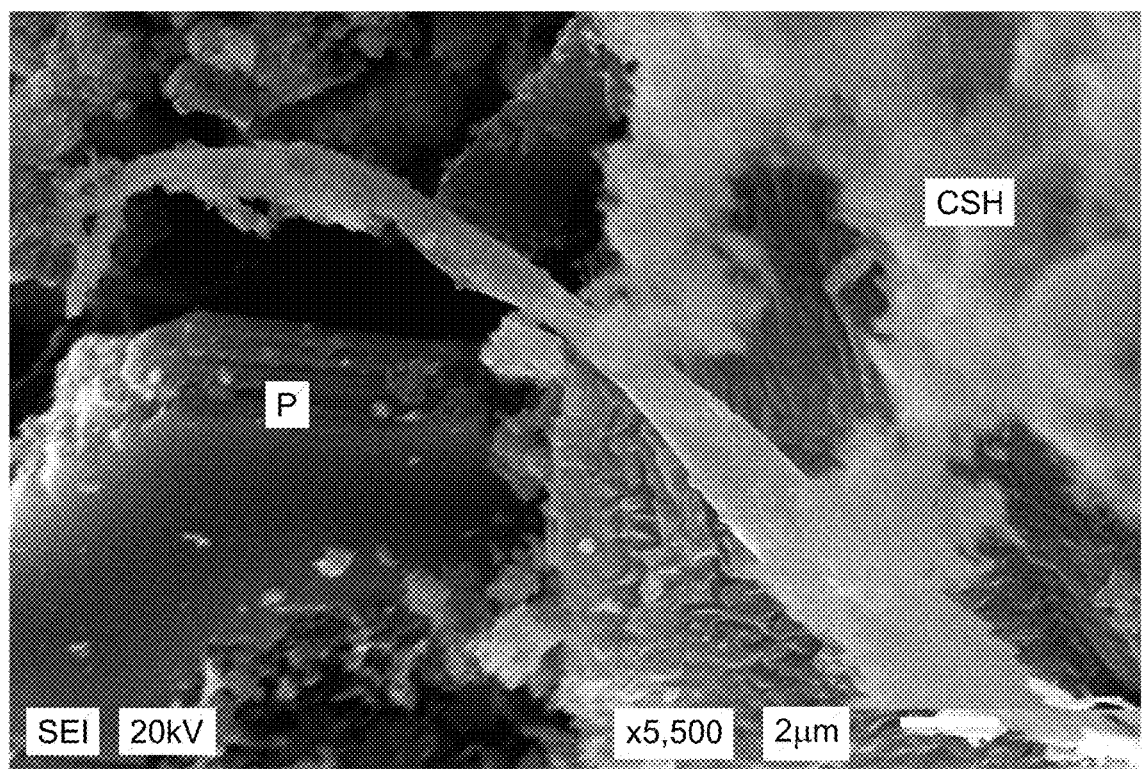
Figure 12B:
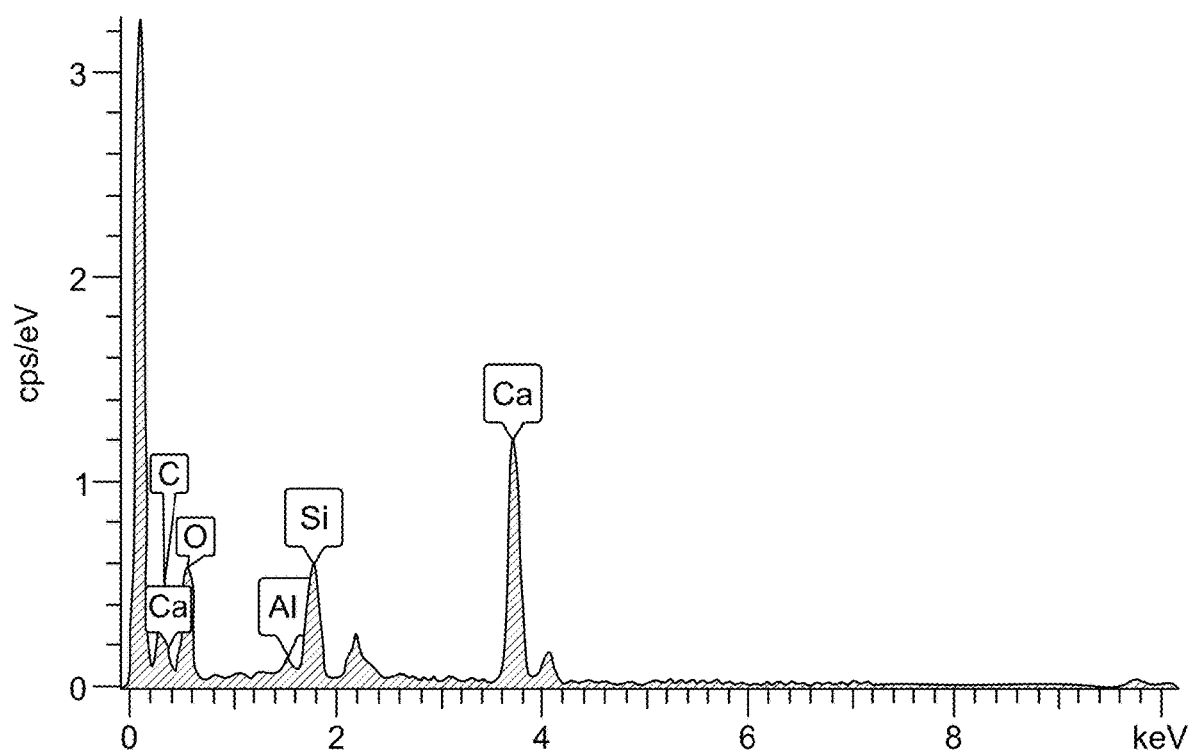

FIGS. 12A and 12B compares the microstructure, morphology of the hydrated products, and the elemental composition of the hydrated products of the CCB_20 and FA_20 cement systems. The images of the gold-coated fractured surfaces show the conventional hydrated products; honeycomb shape of the C—S—H, acicular needles of the ettringite, and the plates of the portlandite. The EDS shows the presence of Ca, Si, and Al. The Ca and Si are a result of the C—S—H gel. The presence of Al shows that calcium aluminate silicate hydrate (C-A-S—H) is present in both systems. This is a characteristic of supplementary cementitious materials with low calcium content.

Effect of Silica Fume on CCB_20 Cement System

Figure 13:
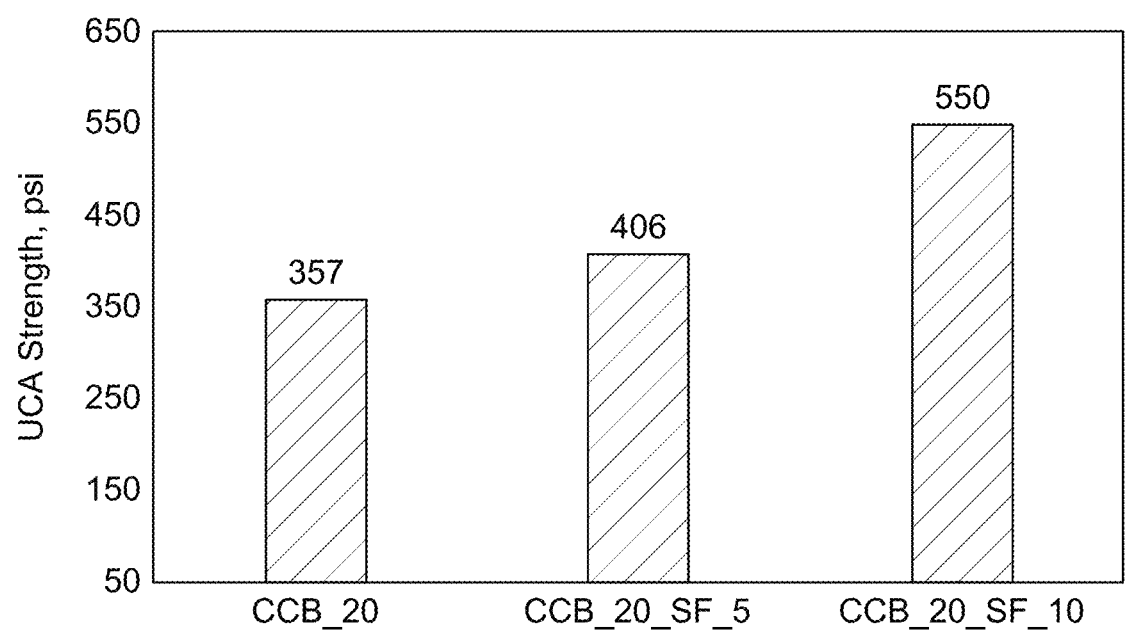
FIG. 13 shows the 24-hour UCA strengths measured at 50° C. and 1000 psi, according to one or more embodiments.

The results indicated that when calcined Saudi calcium bentonite is used at a desired concentration of 20% cement replacement, the performance is comparable to that of fly ash, a material conventionally used to prepare low-density cement systems. However, the one key objective in cement slurry design is to acquire a compressive strength of 500 psi in the shortest possible time. The time to achieve such strength is known as the wait-on-cement time. As presented above, calcium bentonite gave a 24-hour UCA strength of 357 psi. The initial recipe of the 20% calcium bentonite cement, CCB 20%, was modified by incorporating 5% (CCB_20_SF_5) and 10% (CCB_20_SF_10) silica fume. The 24-hour UCA strengths measured at 50° C. and 1000 psi are shown in FIG. 13. It indicates that the strength of the cement can be improved by the inclusion of the silica fume, a highly reactive pozzolan that also acts as a filler.

Materials

The Saudi calcium bentonite chips were crushed, ground, passed through a 90 μm sieve and then calcined in a prewarmed oven at 830° C. for 3 hours. FIG. 1 shows stages of calcium bentonite calcination. It is observed that the pozzolanic reactivity of calcium bentonite is improved at a desired calcination temperature of 830° C., owing to the destruction of the crystalline structure and the formation of non-crystalline compounds. Others have reported that enhanced pozzolanic activity is observed at a calcination period of 3 hours. The mechanism that occurs at such calcination temperature is referred to as dehydroxylation, the removal of the hydroxyl groups from the structure a. It was observed that the bentonite changed its color from grey to reddish-brown upon heating, probably due to modification in its structure as shown in FIG. 1.

The other pozzolanic materials used in this study, that is, the fly ash and silica fume were also passed through the 90-micron sieve. The D90 of the materials were 20.9 μm (Fly ash), 80.3 μm (Silica fume), and 65.2 μm (calcined Saudi calcium bentonite). The class G cement used had about 90% of its particle's size to be less than 58.13 μm.

SEM of Raw Materials

Images of the pozzolans and cement are shown in FIG. 2A-E. The cement particles are irregular while the fly ash and silica fume have a spherical appearance. There was no observable change in the particle morphology of the raw and calcined Saudi calcium bentonite powders. Both clay powders showed irregularly shaped flaky sheets.

Chemical Composition and Density of Raw Materials

The chemical constitution of the materials is shown in Table 3. The molar ratio of $Na_2O/CaO$ in the raw Saudi calcium bentonite is 1.13. Such a value is regarded as low and is a characteristic of calcium bentonite, the non-swelling bentonite. The addition of $SiO_2$, $Al_2O_3$, and $Fe_2O_3$ in the raw calcium bentonite is 90.14% while that in the calcined clay is 91.38%, which makes these materials pozzolanic according to ASTM C618-12a, 2010, the entire disclosure of which is incorporated herein by reference. All the materials have a density lower than the Class G cement. It was observed that the removal of water from the clay upon heat application results in an increase in the density of the clay from 2.47 g/cm$^3$ to 2.59 g/cm$^3$. The class G cement is high in CaO, $SiO_2$, $Fe_2O_3$ and has some amount of $Al_2O_3$ and $SO_3$. The pozzolanic materials all have $SiO_2$, $Fe_2O_3$, and $Al_2O_3$ as key oxides and may contain minor amounts of $K_2O$, $Na_2O$, $SO_3$, MgO, MnO or $TiO_2$. Additional properties such as water and organic content of the raw calcium bentonite are provided in Table 3. The organic content was analyzed using the PerkinElmer 2400 Elemental Analyzer.

TABLE 3

Chemical composition and density of materials.

| Material | Chemical Oxides, weight. % | | | | | | | | | | Density, g/cm³ |
| --- | --- | --- | --- | --- | --- | --- | --- | --- | --- | --- | --- |
| | $SiO_2$ | $Al_2O_3$ | $Fe_2O_3$ | CaO | MnO | $K_2O$ | $Na_2O$ | MgO | $SO_3$ | $TiO_2$ | |
| Cement | 19.53 | 3.25 | 7.29 | 62.12 | — | 1.30 | — | 1.05 | 4.66 | — | 3.20 |
| Raw Calcium Bentonite | 57.98 | 19.70 | 12.46 | 1.11 | — | 1.51 | 1.25 | 1.71 | — | 1.62 | 2.47 |
| Calcined Calcium Bentonite | 56.63 | 19.86 | 14.89 | 1.16 | — | 1.56 | 1.51 | 1.79 | — | 2.20 | 2.59 |
| Fly Ash | 63.21 | 28.62 | 5.12 | 0.79 | 0.03 | 3.31 | — | 0.02 | — | — | 2.13 |
| Silica Fume | 92.72 | 0.70 | 4.81 | 0.81 | 0.31 | — | — | 0.49 | — | — | 2.41 |
| Measured Water Content of Raw Bentonite (wt. %) | | | | | 9.83 | | | | | | |
| Organic Content of Uncalcined Calcium Bentonite, weight. % | | | | | | | | | | | |
| Carbon | | | | | 0.56 | | | | | | |
| Hydrogen | | | | | 1.30 | | | | | | |
| Nitrogen | | | | | 2.41 | | | | | | |
| Sulfur | | | | | 1.79 | | | | | | |

X-ray Diffractogram Analysis of Raw Materials

Figure 3:
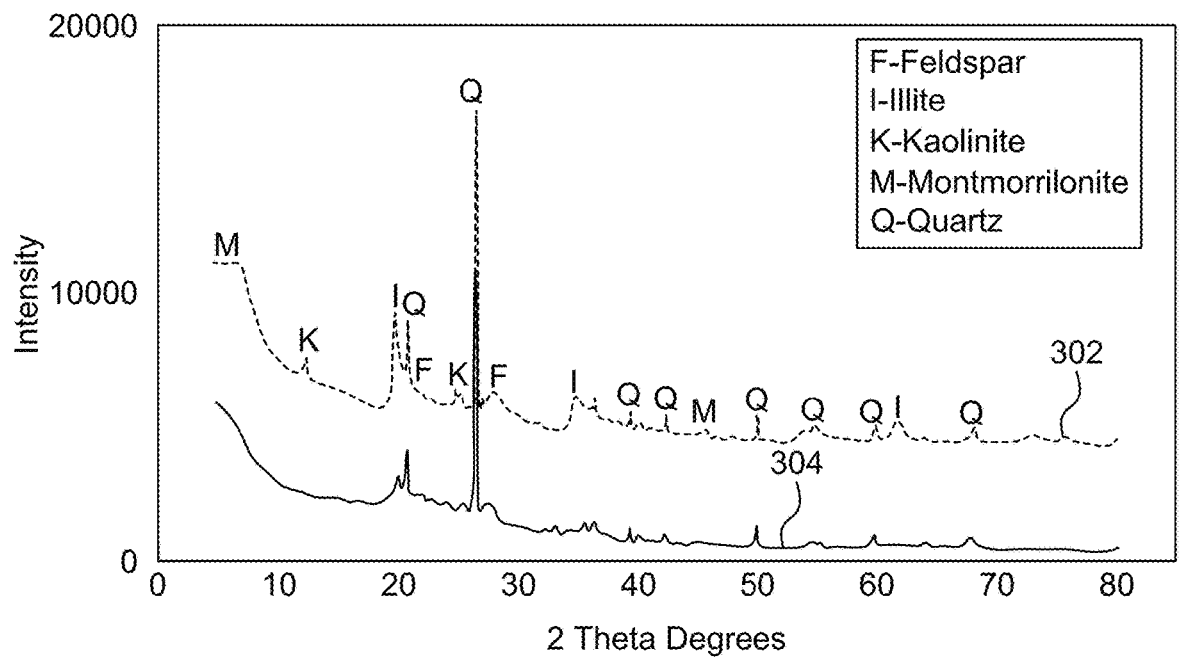
FIG. 3 shows X-ray diffraction (XRD) diffractograms of the calcium bentonite in the raw and calcined forms, according to one or more embodiments.

The XRD diffractograms of the calcium bentonite in the raw and calcined forms are shown in FIG. 3. The raw powder is composed of crystalline phases such as quartz, feldspar, and clay minerals like illite, kaolinite, and montmorillonite. The application of heat resulted in the disappearance of most of the peaks associated with the clay minerals, indicating a deformation in the crystal structure of the clay.

The proportion of phases present in materials used in the cement design are shown in Table 4. The cement is predominantly made up of ($C_3S$) and ($C_2S$), the phases responsible for the generation of calcium silicate hydrate, the gel responsible for strength Scholer in Study of Hydration Processes of Portland Cements Blended with Supplementary Cementitious Materials. Technische Universitat Bergakademie Freiberg). Quartz and dolomite are also present in very small quantities. The fly ash is mainly calcite and quartz. The key crystalline phases present in the silica fume include moissanite, iron silicon, andalusite, and cristobalite. The calcined calcium bentonite is composed predominantly of quartz.

TABLE 4

Mineral phases in cement, fly ash, silica fume, and calcined calcium bentonite.

| Phase | Composition, weight. % |
|---|---|
| Cement | |
| Tricalcium silicate ($C_3S$) | 82 |
| Dicalcium Silicate ($C_2S$) | 17 |
| Quartz | 0.1 |
| Dolomite | 0.9 |
| Fly Ash | |
| Quartz | 43.2 |
| Mullite | 55.9 |
| Hematite | 0.9 |
| Silica Fume | |
| Moissanite | 38 |
| Iron Silicon | 17 |
| Andalusite | 30 |
| Hematite | 2 |
| Cristobalite | 13 |
| Calcined Calcium Bentonite | |
| Quartz | 67.6 |
| Feldspar | 2.4 |
| Illite | 16.1 |
| Kaolinite | 13.9 |
| Montmorillonite | Trace |

Method

Stable cement slurries with zero free water were designed at 12.5 ppg using mass balance calculations. The calcined Saudi calcium bentonite (CCB) was used in amounts of 10%-30% cement replacement. The proportions of all additives in the mix design are shown in Table 5. The rheology of the cement systems was performed with the FANN 35 viscometer. The thickening time of these systems was investigated at 43° C. and 1000 psi in a high-pressure high temperature (HPHT) consistometer. X-ray diffraction (XRD) and thermogravimetry analysis (TGA) were performed to investigate the reactivity of the pozzolans. The XRD scans were taken within 2-theta angles of 5° to 110°. FOR TGA analysis, the heating was done up to 1000° C. in a TGA 1-star system at a rate of 10° C./mins in an atmosphere of air. The compressive strength and tensile strength were used to characterize the mechanical characteristics of the cured systems. The pore space of hardened cement pastes was investigated using the nuclear magnetic resonance (NMR) technique. The JEOL JSM6610LV scanning electron microscope (SEM) device equipped with energy-dispersive X-ray spectroscopy (EDS), SEM-EDS, was used to analyze the microstructure and morphology of the hydrated products.

The laboratory procedures used in this study were all in line with the guidelines in the API RP 10 B-2, 2013; API Spec 10A, 2019), the entire disclosure is incorporated herein by reference. The proportions of all additives in the mix design are given in Table 5.

TABLE 5

Mix design.

| Material | CCB_10 | CCB_20 | CCB_30 |
|---|---|---|---|
| Cement, % | 90 | 80 | 70 |
| Calcined Calcium Bentonite, % | 10 | 20 | 30 |
| Calcium Chloride, % | 2.5 | 2.5 | 2.5 |
| Anti-Settling Agent, % | 2 | 2 | 2 |
| Defoamer, g | 1 | 1 | 1 |
| Water, g | 643 | 630 | 617 |

Numerous modifications and variations of the present invention are possible in light of the above teachings. It is therefore to be understood that within the scope of the appended claims, the invention may be practiced otherwise than as specifically described herein.

The invention claimed is:

1. A method for zonal isolation in a well located in a geological formation, comprising:
   calcining an uncalcined calcium bentonite having $SiO_2$ in an amount of from 55 wt. % to 60 wt. %, having $Al_2O_3$ in an amount of from 15 wt. % to 20 wt. %, and having $Fe_2O_3$ in an amount of from 10 wt. % to 15 wt. % based on the total weight of the uncalcined calcium bentonite to form a calcined calcium bentonite;
   wherein the calcined calcium bentonite has $SiO_2$ in an amount of from 55 wt. % to 60 wt. %, $Al_2O_3$ in an amount of from 19 wt. % to 24 wt. %, and $Fe_2O_3$ in an amount of from 15 wt. % to 19 wt. % based on the total weight of the calcined calcium bentonite; and
   mixing the calcined calcium bentonite with cement and water to form an admixture comprising the calcined calcium bentonite in an amount of from 10 wt. % to 30 wt. % based on the total weight of the admixture to form a low-density cement slurry having a density of from 10 pounds per gallon (ppg) to 15 ppg; and
   wherein a ratio of $Na_2O/CaO$ in the calcined calcium bentonite is at least 1.1; and
   adding an amount of silica fame of from 5 wt. % to 10 wt. % of said admixture to the low-density cement slurry to form a well cement system; and
   injecting the well cement system into the well to seal the well from the geological formation; and
   curing the well cement system to seal the well from the geological formation.

2. The method of claim 1, wherein the uncalcined calcium bentonite is crushed and grinded and then calcined at a temperature of at least 830° C. for at least 3 hours.

3. The method of claim 1, wherein mixing the calcined calcium bentonite with cement comprises mixing the cement, the calcined calcium bentonite, calcium chloride, an anti-settling agent, a defoamer, and water to form the low-density cement slurry, wherein the low-density cement slurry comprises the cement in an amount of from 70 wt. % to 90 wt. % of the slurry, the calcined calcium bentonite in all amount of from 10 wt. % to 30 wt. % of the slurry, the calcium chloride in an amount of at least 2.5 wt. % of the slurry, the anti-settling agent in an amount of at least 2 wt. % of the slurry, at least 1 g of the defoamer, and from 617 g to 643 g of water.

4. The method of claim 1, wherein when an amount of 10 wt. % silica fume of said admixture has been added, the UCA strength at 24 hours at 50° C. and 1000 psi is at least 550 psi.

5. The method of claim 1, wherein the calcined calcium bentonite further has an amount of CaO not greater than 2 wt. % of the calcined calcium bentonite, an amount of $K_2O$ not, greater than 2 wt. % of the calcined calcium bentonite, an amount of $Na_2O$ not greater than 2 wt. % of the calcined calcium bentonite, an amount of MgO not greater than 2 wt. % of the calcined calcium bentonite, and an amount of $TiO_2$ not greater than 2 wt. % of the calcined calcium bentonite.

6. The method of claim 1, wherein the calcined calcium bentonite has a density of from 2.5 g/cm³ to 4 g/cm³.

7. The method of claim 1, wherein the calcined calcium bentonite has a density of from 2 g/cm³ to 3.5 g/cm³.

8. The method of claim 1, wherein the calcined calcium bentonite has at least 65 wt. % quartz based on the calcined calcium bentonite, an amount of illite of at least 15 wt. % of the calcined calcium bentonite, and an amount of kaolinite of at least 12 wt,% of the calcined calcium bentonite.

9. The method of claim 1, wherein the calcined calcium bentonite is in the form of particles having an irregularly shaped flaky sheet form.

10. The method of claim 1, wherein the low-density cement slurry after the curing has a tensile strength of at least 70 pounds per square inch (psi).

11. The method of claim 1, wherein the low-density cement slurry after the curing has a porosity of at least 0.55 porosity units.

12. The method of claim 1, wherein an amount of silica fume of 5 wt. % silica fume is added to a 20 wt. % admixture and increases an ultrasonic cement analyzer (UCA strength) of said admixture by at least 50 psi when compared to a 20 wt. % admixture without silica fume.

13. The method of claim 12, wherein said admixture with the 5 wt. % silica fume has a UCA strength of from 400 psi to 600 psi.

14. The method of claim 1, wherein an amount of silica fume of wt. % silica fume is added to a 20 wt. % admixture and increases a UCA strength of said admixture by at least 190 psi when compared to a 20 wt. % admixture without silica fume.

15. The method of claim 14, wherein said admixture with the 10 wt. % silica fume has a UCA strength of at least 550 psi.

16. The method of claim 1, wherein particles of the silica fume have a spherical shape.

17. The method of claim 1, wherein the silica fume has an amount of $SiO_2$ of from 90 wt. % to 95 wt. % of the silica fume, an amount of $Al_2O_3$ of from 0.5 wt. % to 1 wt. % of the silica fume, and an amount of $Fe_2O_3$ of from 3 wt. % to 5 wt. % of the silica fume.

18. The method of claim 1, wherein silica fume has a density of from 2.4 g/cm³ to 3.5 g/cm³.

19. The method of claim 1, wherein the silica fume has crystallin phases having:

an amount of moissanite of at least 35 wt. % of the silica fume, an amount of iron silicon of at least 15 wt. % of the silica fume, an amount of andalusite of at least 30 wt. % of the silica fume, and an amount of cristobalite of at least 10 wt. % of the silica fume.

20. The method of claim 1, wherein the ratio of $Na_2O$/CaO in the uncalcined calcium bentonite is 1.1 to 1.3.

\* \* \* \* \*